(12) United States Patent
Vaizman

(10) Patent No.: US 11,297,489 B2
(45) Date of Patent: Apr. 5, 2022

(54) METHODS AND SYSTEMS FOR CHARACTERIZING WIRELESS DEVICES

(71) Applicant: Comcast Cable Communications, LLC, Philadelphia, PA (US)

(72) Inventor: Yonatan Vaizman, Washington, DC (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 261 days.

(21) Appl. No.: 16/735,253

(22) Filed: Jan. 6, 2020

(65) Prior Publication Data

US 2021/0211863 A1 Jul. 8, 2021

(51) Int. Cl.
| | |
|---|---|
| *H04W 8/22* | (2009.01) |
| *H04W 8/00* | (2009.01) |
| *G06N 20/00* | (2019.01) |
| *H04L 41/16* | (2022.01) |
| *H04W 16/22* | (2009.01) |
| *H04L 41/147* | (2022.01) |
| *H04L 41/50* | (2022.01) |
| *H04L 43/0817* | (2022.01) |
| *G06N 7/00* | (2006.01) |

(52) U.S. Cl.
CPC ............. *H04W 8/22* (2013.01); *G06N 7/005* (2013.01); *G06N 20/00* (2019.01); *H04L 41/147* (2013.01); *H04L 41/16* (2013.01); *H04L 41/5032* (2013.01); *H04L 43/0817* (2013.01); *H04W 8/005* (2013.01); *H04W 16/22* (2013.01)

(58) Field of Classification Search
None
See application file for complete search history.

(56) References Cited

U.S. PATENT DOCUMENTS

| | | | |
|---|---|---|---|
| 6,745,011 B1 | 6/2004 | Hendrickson et al. | |
| 7,020,082 B2 | 3/2006 | Bhagavath et al. | |
| 7,080,141 B1 | 7/2006 | Baekelmans et al. | |
| 7,249,269 B1 | 7/2007 | Motoyama | |
| 8,532,610 B2 | 9/2013 | Manning Cassett et al. | |
| 11,102,082 B1* | 8/2021 | Sarel | G06N 7/005 |
| 2010/0318647 A1 | 12/2010 | Savoor et al. | |
| 2016/0162783 A1* | 6/2016 | Tan | H04W 24/02 706/13 |
| 2019/0159035 A1* | 5/2019 | Town | H04L 63/1441 |
| 2021/0099970 A1* | 4/2021 | Omer | G01S 13/52 |
| 2021/0120400 A1* | 4/2021 | Li | H04W 72/048 |

OTHER PUBLICATIONS

Meidan et al., "ProfilloT: A Machine Learning Approach for IoT Device Identification Based on Network Traffic Analysis", SAC '17: Proceedings of the Symposium on Applied Computing, Apr. 2017 pp. 506-509.
Miettinen et al., "IoT SENTINEL: Automated Device-Type Identification for Security Enforcement in IoT", 2017 IEEE 37th International Conference on Distributed Computing Systems (ICDCS), Jun. 5-8, 2017.

* cited by examiner

*Primary Examiner* — Robert M Morlan
(74) *Attorney, Agent, or Firm* — Ballard Spahr LLP

(57) ABSTRACT

Methods and systems for characterizing wireless devices are described. Data associated with communications involving the wireless devices may be analyzed to characterize the wireless devices.

20 Claims, 12 Drawing Sheets

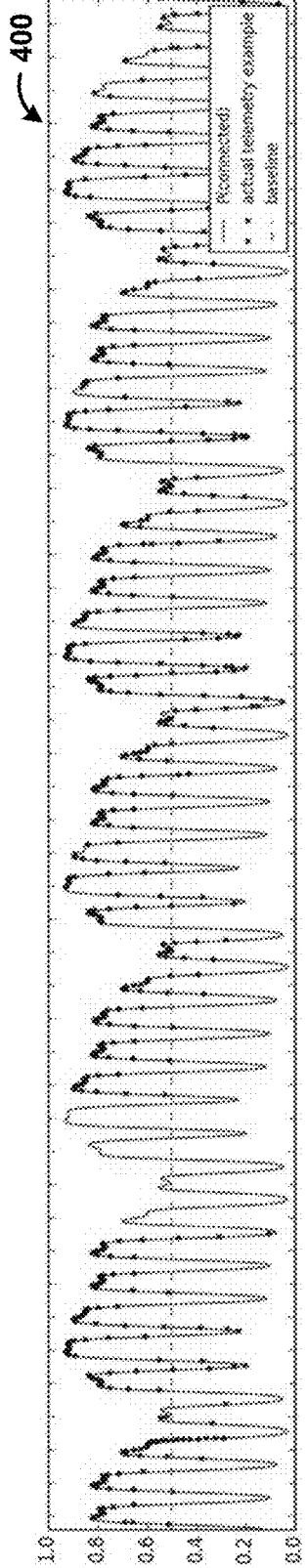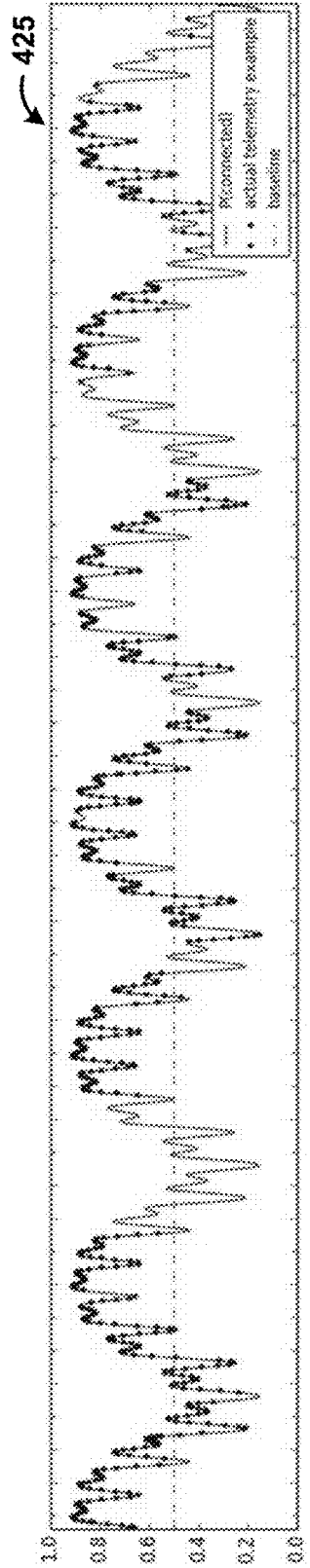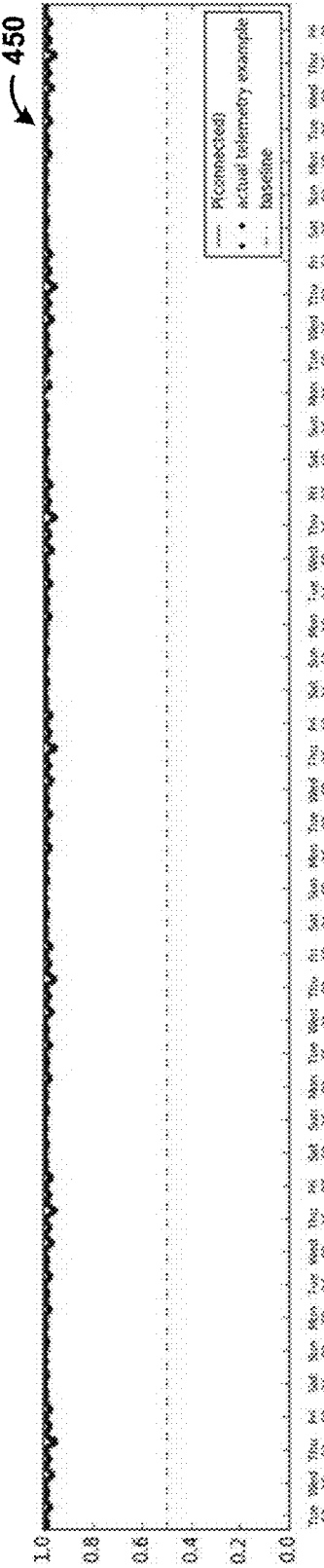

METHODS AND SYSTEMS FOR CHARACTERIZING WIRELESS DEVICES

BACKGROUND

As more electronic devices utilize communication networks (e.g., wireless networks), characterizing individual devices communicating with the wireless network becomes more difficult. While a device can be identified by certain device identifiers, such as a Media Access Control (MAC) address, the identity of the device cannot be determined based strictly on the MAC address because MAC addresses are not completely informative or useful. Rather, a MAC address simply indicates the manufacturer of a Network Interface Controller (NIC) of the device, and does not indicate whether the device is a phone versus a laptop, whether the device is used by a child or an adult, whether the device is a work device or a leisure device, and so forth. More specific properties can be identified based on the content of data sent and received by the device, however, intercepting and analyzing such data raises privacy concerns.

SUMMARY

It is to be understood that both the following general description and the following detailed description are exemplary and explanatory only and are not restrictive. Methods and systems for characterizing wireless devices are described. A user device (e.g., a computing device) may communicate with a network device (e.g., a gateway, a router, etc.) via a wireless network (e.g., Wi-Fi) to access a service (e.g., the Internet). The network device may determine times at which the user device is connected to the network device. The network device, or another computing device, may determine a probability that the user device is connected to the network over a period of time. The probability may be periodic. That is, the probability may have a period (e.g., hourly, daily, weekly, monthly, etc.) indicating repetitive patterns. The network device, or the computing device, may determine one or more probabilities that are related to the determined probability. The related probabilities may be determined by utilizing machine learning to identify the related probabilities from a plurality of probabilities. The related probabilities may be associated with one or more devices and/or user demographics. The network device, or the computing device, may then utilize the associated devices to determine one or more characteristics about the user device connected to the network device and/or demographics of a user of the user device. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems:

FIGS. 4A-4C show diagrams of example periodic probabilities;

DETAILED DESCRIPTION

Figure 1:
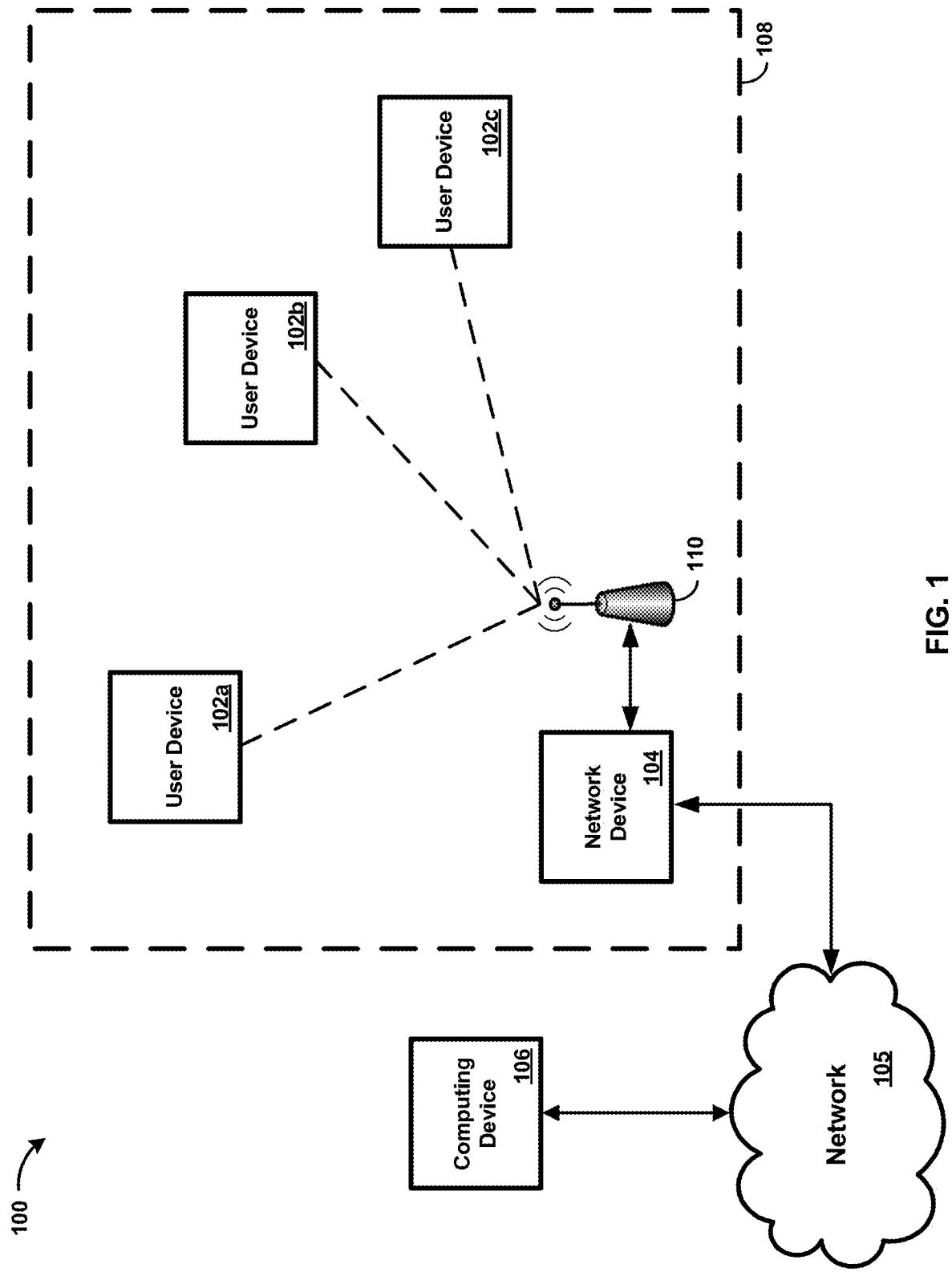
FIG. 1 shows an example system for wireless communication.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Methods and systems are described for identifying characteristics of user devices on a wireless network. In contrast to previous methods that involve analysis of underlying data exchanged by the user devices on the network, including a destination of the data, a network device is described that may utilize measurements of telemetric properties sampled at different times to identify characteristics of the user devices. Thus, the present disclosure does not require special access to individual data packets, which in turn reduces privacy concerns that a user of the user device may raise. Further, characterizing categories of user devices can be useful both to end users (e.g., to help them manage their home's devices) and to "smart" systems behind the scenes, which can automatically manage the wireless network or otherwise detect problems with the wireless network.

A computing device may measure one or more telemetric properties of a device to determine one or more telemetry values. The computing device may utilize the telemetry values to determine patterns of telemetry associated with the user device. Some examples of telemetric properties may be whether a user device is connected to a network device or not, download/upload byte counts, physical layer transmission bit rate and/or receive bit rate, Received Signal Strength Indicator (RSSI), combinations thereof, and the like. The network device may determine the telemetry values for some or all user devices in communication with the network device. The network device may determine the telemetry values periodically (e.g., every minute, every 30 minutes, every hour, etc.). However, the network device is not required to determine the telemetry values periodically. Utilizing the telemetry values, the user device may be identified, such as the technological specifications and characteristics of the user device (e.g., smartphone vs. computer). Further, behavioral usage of the user device (e.g., work device vs. leisure device) may also be determined. Additionally, demographics of a user of the user device may be determined based on the telemetry values.

For each telemetry variable (e.g., whether the user device is connected to the network), the user device may be modeled as a time series of a weighted sum of repetitive functions, to capture repetitive time patterns. To do so, a set of time periods (e.g. 1 day, 1 week, 1 month, etc.) that may be meaningful to describe patterns in human behavior are determined. For each time point, the time may be represented with relevant time phases in selected time periods. In order to fully represent a time phase within a period of time (e.g., 1 day, 1 week), both cosine and sine functions may be used for each period of time. For example, time point t, which may represented as a timestamp, may indicate the time a user device connects to a wireless network. The time point t may be represented with a set of periodic functions (e.g., Cos(2*pi*t/SECONDS_IN_1DAY), Sin(2*pi*t/SECONDS_IN_1DAY), Cos(2*pi*t/SECONDS_IN_1WEEK), and/or Sin(2*pi*t/SECONDS_IN_1WEEK)). Coefficients may be determined that are associated with the set of periodic functions. For example, the determined coefficients may indicate the probability that a user device is connected to a wireless network at the time point t.

Machine learning may be utilized to determine patterns of telemetry based on the periodic functions. For example, a first stage of machine learning may be applied to each user device that connects to a wireless network to determine patterns of telemetry based on the periodic functions. In the first stage of machine learning, a machine learning module may be trained based on data associated with a plurality of known devices. For example, a plurality of premises may be associated with a plurality of known devices, and data is collected for each of the known devices from each of the plurality of premises. Further, one or more labels and/or characteristics associated with each device may be known and provided to the machine learning module along with the data. The machine learning module may utilize the data (e.g., is trained on the data) to determine an association between the data associated with each device and the labels and/or characteristics.

In a second stage of machine learning, once the machine learning module has been trained in the first stage, the machine learning module is provided data associated with an unknown device to determine the characteristics for the unknown device. Further, the machine learning module continues to learn during the second stage of machine learning as more and more data is provided to the machine learning module. Thus, the machine learning module continues to improve over time.

As an example of machine learning, if the telemetry variable is binary (e.g., connected vs. not connected) or categorical (e.g., connected to 2.4 GHz vs. connected to 5 GHz vs. not connected), a linear classifier (e.g., logistic regression) may be trained during the first stage of machine learning to determine the patterns of telemetry. For example, the linear classifier may determine the probability that a user device is connected to a wireless network at any point in time. If the telemetry variable is continuous/scalar (e.g., RSSI, download byte count, etc.), a linear regression (e.g., a regressor) may be trained during the first stage of machine learning with fitting an intercept and a regularizing term. For example, the linear regression may predict an expected value of the telemetry variable (e.g., RSSI, download byte count) at any given time. Stated differently, the linear regression may predict an expected telemetry value for a given telemetry measurement. The trained model (e.g., the linear regressor, the linear classifier, etc.) may then be used in the second stage of machine learning to determine a pattern of the telemetry variables for an unknown device based on telemetry values associated with the unknown device.

FIG. 1 shows a system 100 for wireless communication. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may have user devices 102a,b,c a network device 104, and a computing device 106. The network device 104, a wireless access point 110, and the user devices 102a,b,c may be located at a premises 108. As will be appreciated by one skilled in the art, the system 100 may have any quantity of user devices 102, network devices 104, and computing devices 106. The user devices 102a,b,c may be an electronic device such as a computer, a smartphone, a laptop, a tablet, a set top box, a display device, or other device capable of communicating with the network device 104. The user devices 102a,b,c may be Internet of Things (IoT) devices such as any low powered electronic device which may include a smart device (e.g., a home automation device, a smart thermostat, a home electronic hub, etc.), a security system (e.g., electronic camera, smart doorbell, etc.), and so forth.

The wireless access point 110 may be configured to provide one or more wireless networks in at least a portion of the premises 108. The wireless access point 110 may be configured to provide access to the network 105, via the network device 104, to devices configured with a compatible wireless radio, such as a user devices 102a,b,c. For example, the wireless access point 110 may provide a user managed network (e.g., local area network), a service provider managed network (e.g., public network for users of the service provider), and/or the like. While the wireless access point 110 is shown as a separate device from the network device 104 for ease of explanation, a person skilled in the art would appreciate that the network device 104 may include the capabilities of the wireless access point 110.

The network device 104 may be configured to communicate with the network 105. The network device 104 may be a wireless communication device. For example, the network device 104 may be a modem (e.g., cable modem), a router, a gateway, an access point, a switch, a network terminal (e.g., optical network unit), and/or the like. The network device 104 may be configured for communication with the network 105 via a variety of protocols, such as internet protocol, transmission control protocol, file transfer protocol, session initiation protocol, voice over internet protocol, and/or the like. The network device 104 may be configured to provide network access via a variety of communication protocols and standards, such as Data Over Cable Service Interface Specification (DOCSIS). For example, the network device 104 may utilize a communication protocol to provide a wireless communications network (e.g., Wi-Fi, Bluetooth, etc.). The user devices 102a,b,c may communicate with the network device 104 via the wireless communication network. For example, the user devices 102a,b,c may utilize a Wi-Fi network associated with the network device 104 to communicate with the network device 104. The user devices 102a,b,c may communicate via the network device 104 to access a service, such as the Internet or other services.

The network device 104 may determine times that the user devices 102a,b,c are connected with the wireless network. The network device 104 may determine that the user devices 102a,b,c are connected with the wireless network based on receiving data (e.g., one or more packets) from the user devices 102a,b,c. The network device 104 may determine a time that the data is received by the network device 104. The time may be determined based on a time stamp associated with the data. For example, when the user devices 102a,b,c send data to the network device 104, the data may have a time stamp that indicates the time that the user devices 102a,b,c sent the data. The time may also be determined based on a time that the network device 104 received the data.

The network device 104 may store the times that the user devices 102a,b,c are connected with the wireless network. The network device 104 may also store the times that the user devices 102a,b,c are not connected with the wireless network. The network device 104 may keep track of each of the user devices 102a,b,c individually. That is, the network device 104 may separately determine and store the times that each of the user devices 102a,b,c are connected with the wireless network. The network device 104 may store the times on a memory associated with the network device 104 and/or the network device 104 may send the times to another device (e.g., the computing device 106) which stores the times.

The network device 104 may also determine and/or store additional information (e.g., connection characteristics) about the user devices 102a,b,c such as download/upload byte counts, physical layer Transmission bit rate and/or Receive bit rate, Received Signal Strength Indicator (RSSI), and so forth. The network device 104 may collect and/or sample the additional information. Stated differently, the network device 104 may measure connection characteristics associated with the user devices 102a,b,c and store the measured characteristics. The network device 104 may measure the connection characteristics periodically or irregularly. For example, the network device 104 may determine a quantity of data (e.g., a quantity of bytes) downloaded and/or uploaded by the user devices 102a,b,c during a period of time (e.g., 30 seconds, 1 minute, 5 minutes, 15 minutes, and so forth). That is, the network device 104 may determine the quantity of data that is sent to and/or received from the user devices 102a,b,c during the period by determining the quantity of data sent at set intervals of time (e.g., 30 seconds, 1 minute, 5 minutes, 15 minutes, and so forth). As an example, the network device 104 may determine the amount of data that each of the user devices 102a,b,c, sends and/or receives during a 30 second period of time. The network device 104 may continuously measure the data sent to and/or received from the user devices 102a,b,c every 30 seconds. Thus, in a span of 1 hour, the network device 104 may have data recorded for 120 different 30 second periods for each of the user devices 102a,b,c.

The network device 104 may identify the user devices 102a,b,c based on the user devices 102a,b,c interactions with the network device 104 (e.g., the time connected to the network, the download/upload byte counts, etc.). The network device 104 may identify the user devices 102*a,b,c* based on telemetry measurements sampled at different times. For example, the user device 102*a* may be a smartphone associated with a first user, and the user device 102*b* may be a smartphone associated with a second user. The first user may be a parent of the second user. The user device 102*a* may communicate with the network device 104 when the user device 102*a* is located within the premises 108. The parent may work a job that has the parent away from the premises 108 from approximately 8:30 AM to 5:30 PM Monday through Friday, which means the user device 102*a* is not connected to the wireless network from approximately 8:30 AM to 5:30 PM Monday through Friday. In contrast, the child may go to school from 8:00 AM to 3:00 PM Monday through Friday, which means the user device 102*b* is not connected to the wireless network from approximately from 8:00 AM to 3:00 PM Monday through Friday. The network device 104 may store the times that the user devices 102*a,b* are, and are not, connected to the wireless network. The network device 104 may store the data based on periods of time. For example, the network device 104 may determine every 30 seconds whether or not the user devices 102*a,b* are, or are not, connected to the wireless network. As another example, the network device 104 may determine the times that the user devices 102*a,b* are, or are not, connected to the wireless network in a longer period of time such as one day and/or one week.

The network device 104 may determine a probability that the user device 102*a* is connected to the wireless network, and may determine a probability that the user device 102*b* is connected to the wireless network. The network device 104 may determine a time pattern model to determine the repetitive pattern of each of the user devices' 102*a,b* telemetry values (e.g., a repetitive pattern of "connected vs. not connected," repetitive pattern of "number of bytes downloaded," etc.). The time pattern model indicates the probability that a user device is connected to the wireless network at a point in time. The time pattern model may have one or more functions associated with the time pattern model. For example, the time pattern model may be a model that has a sine function and a cosine function. The time pattern model may be associated with one or more coefficients. The one or more coefficients may represent the significance (e.g., the impact, the weight, the influence, etc.) of each of the periodic components (e.g., the time of day, the time of week) of the time pattern model. As an example, the sine function may have a respective coefficient, and the cosine function may have a respective coefficient as well. The coefficients may indicate the weight (e.g., significance) of the respective function in fitting the time pattern model to the probability that the user device is connected to the network. As an example, the cosine function may not be a good indicator of whether or not the user device is connected to the wireless network. Thus, the coefficient of the cosine function may have a low value to reduce the influence of cosine function in determining whether the user device is connected to the wireless network. In contrast, the sine function may be a good indicator of whether or not the user device is connected to the wireless network. Thus, the coefficient of the sine function may have a high value to increase the influence of the since function in determining whether the user device is connected to the wireless network. The coefficients may have any value (e.g., from 0 to 1, 0 to 100, etc.).

The network device 104 may determine one or more coefficients that indicate a probability that a user device is connected to the network associated with the network device 104. The user device 102 may have a periodicity associated with the user device being connected to network that can be described with sinusoidal functions (e.g., sine, cosine, etc.). A sinusoidal function can be characterized (e.g., identified, determined, etc.) based on coefficients associated with the sinusoidal function. For example, the sinusoidal function may be characterized by a period of the sinusoidal function, a phase of the sinusoidal function, and an amplitude of the sinusoidal function. A model may be fit based on the data of when the user device 102 is connected to determine the coefficients for the sinusoidal function. As an example, the following model may be used:

$$\mu(t) = \mu + \lambda_d \sin\left(\phi_d + t\frac{2\pi}{D}\right) + \lambda_w \sin\left(\phi_w + t\frac{2\pi}{W}\right)$$

In the example model above, t is the time in seconds since the epoch, D is the number of seconds in a single day, W is the number of second in a week, and the coefficients that need to be determined (e.g., characterized, fit, etc.) are: the baseline constant μ, the amplitude of the daily component $\lambda_d$, the amplitude of the weekly component $\lambda_w$, the phase of the daily component $\Phi_d$, and the phase of the weekly component $\Phi_w$. These coefficients may be determined by utilizing Fourier analysis to fit the sinusoidal function to the times that the user device 102 is connected to the network. The analysis will determine the coefficients that indicate the probability that the user device is connected to the wireless network associated with the network device 104. As will be appreciated by one skilled in the art, there are multiple methods to determine fitted coefficients and the present disclosure should not be limited to Fourier analysis.

The network device 104 may determine coefficients of a sine function and a cosine function associated with a first period (e.g., a 24 hour period of time that represents a day). The network device 104 may determine the coefficients for the first period of time utilizing the following equations: Cos(2\*pi\*t/SECONDS_IN_1DAY) and Sin(2\*pi\*t/SECONDS_IN_1DAY). The network device 104 may determine the coefficients for a second period of time (e.g., a 168 hour period of time that represents a week) utilizing the following equations: Cos(2\*pi\*t/SECONDS_IN_1WEEK), and Sin(2\*pi\*t/SECONDS_IN_1WEEK). The network device 104 may determine the coefficients of the periodic components for the user device 102*a* and the user device 102*b*. The coefficients may indicate the weight (e.g., the importance) of the respective functions. The coefficients may indicate the probability that the user devices 102 are connected to the wireless network associated with the network device 104.

The network device 104 may compare the determined coefficients to coefficients associated with previously known devices to determine one or more characteristics of the user devices 102*a,b* and/or users of the user devices 102*a,b*. The determined coefficients for the user device 102*a*, as well as the determined coefficients of the user device 102*b*, may indicate (e.g., represent) the probability that the user device 102*a* is connected to the wireless network associated with the network device 104. For example, the network device 104 may compare the determined coefficients to one or more previously known devices. The one or more previously known devices may have one or more coefficients similar to the determined coefficients. Further, the previously known devices may have one or more characteristics associated with them. The characteristics may include a manufacturer of the previously known device, hardware specifications of the previously known device, and/or software of the previously known device. Further, the previously known device may be associated with a user that has similar characteristics and/or demographics. For example, the demographics of the user may include age, geographic location, occupation, usage habits associated with the device, and/or any other characteristic associated with a user.

The network device 104 may compare the determined coefficients for the user device 102a and the user device 102b to one or more previously determined coefficients to determine one or more characteristics of the user devices 102. The network device 104 may utilize the characteristics of the one or more related coefficients to infer one or more characteristics of the user devices 102a,b. For example, the determined coefficients for the user device 102a, as well as the determined coefficients of the user device 102b, may indicate (e.g., represent) the probability that the user device 102a is connected to the wireless network associated with the network device 104. The probability that the user device 102a is connected to the wireless network indicates the usage of the user device 102a (e.g., how a user of the user device 102a uses the user device 102a). Thus, if there is a previously determined user device with previously determined coefficients that are similar (e.g., close to, an exact match, approximate to, etc.) to the determined coefficients for the user device 102a, then the user device 102a is connected to (e.g., used) in a similar manner to the previously determined user device. Therefore, the network device 104 can infer one or more characteristics of a user of the user devices 102a,b based on the characteristics of the user of the previously known device. Accordingly, one or more characteristics of the previously determined user device may indicate one or more characteristics of the user device 102a because the previously determined user device and the user device 102a are used in a similar manner. Therefore, the previously determined coefficients may indicate one or more characteristics of the user device 102a based on the determined coefficients for the user device 102a.

The network device 104 may utilize the MAC address of the user devices 102a,b, along with the coefficients associated with the user devices 102a,b, to determine the type of device of the user devices 102. The type of device may include the make, model, manufacturer, etc. The network device 104 may utilize the MAC address to determine the manufacturer of the network card of the user devices, but the manufacturer does not indicate what the specific devices are. The network device 104 can utilize the coefficients, which indicate the usage of the user devices 102, to determine what type of model the device is and/or information associated with a user of the user device. For example, the user device 102a may be a smartphone of a manufacturer, and the user device 102c may be a laptop of the manufacturer. The user device 102a will have different coefficients that the user device 102c because a user will use a smartphone differently that a laptop. The laptop may be used for a couple hours each day, but is disconnected from the network the rest of the time. In contrast, the smartphone might be connected with the network while the user is in the home and is used regularly while the user is home. Thus, the coefficients that represent the probability that the laptop is connected will be different from the coefficients that represent the probability that the smartphone is connected. Accordingly, the coefficients indicate the different usage between the laptop and the smartphone, and the coefficients may be used to determine the one or more characteristics of the laptop and/or the smartphone.

Returning to the above example of the parent and child, the network device 102 may determine one or more related/similar coefficients to the coefficients of the user device 102a. The related coefficients may indicate one or more characteristics of the user of the user device. For example, the related coefficients may indicate a usage of the user device (e.g., a probability that the user device is connected to the wireless network. As an example, the related coefficients may indicate that the user device is associated with a parent who works 8:30 AM to 5:30 PM Monday through Friday, which aligns with the characteristics of the user of the user device 102a. Thus, the network device 104 may infer that the user device 102a is associated with a parent, and identify the user device 102a as a device associated with a parent. Similarly, the network device 104 may determine related coefficients for the user device 102b that indicates that the user device 102b is associated with a child. Thus, the network device 104 can identify the user device 102b as being associated with the child. The network device 104 can make this determination without accessing the contents of data sent by the user devices 102.

The network device 104 may communicate with the computing device 106 via the network 105. The computing device 106 may be a server that is located remotely from the network device 104. The computing device 106 may be associated with a content provider and/or an Internet Service Provider (ISP). The computing device 106 may communicate with a plurality of network devices 104 located at a plurality of premises 108. The plurality of premises 108 may each be associated with a separate location. The network device 104 may send (e.g., provide) the computing device 106 with data associated with the user devices 102a,b,c. For example, the network device 104 may determine data associated with each of the user devices 102a,b,c. The data may indicate the network usage by the user devices 102a,b,c. For example, the network device 104 may send the times that the user devices 102a,b,c are connected with the wireless network. The computing device 106 may receive the times that the user devices 102a,b,c are connected with the wireless network. The computing device 106 may store the times that the user devices 102a,b,c are connected with the wireless network. The computing device 106 may also store the times that the user devices 102a,b,c are not connected with the wireless network. The computing device 106 may keep track of each of the user devices 102a,b,c individually. That is, the computing device 106 may separately determine and store the times that each of the user devices 102a,b,c are connected with the wireless network. The computing device 106 may also determine and/or store additional information about the user devices 102a,b,c such as download/upload byte counts, physical layer Transmission bit rate and/or Receive bit rate, Received Signal Strength Indicator (RSSI), and so forth. The computing device 106 may use the data provided by the network device 104 to generate training data that may be used to train a machine learning classifier to determine one or more characteristics of the user devices 102a,b,c.

The computing device 106 may identify the user devices 102a,b,c based on the user devices 102a,b,c interactions with the network device 104 (e.g., the time connected to the network, the download/upload byte counts, etc.). The computing device 106 may identify the user devices 102a,b,c based on telemetry measurements sampled at different times. For example, the user device 102a may be a smartphone associated with a first user, and the user device 102b may be a smartphone associated with a second user. The first user may be a parent of the second user. The user device 102a may communicate with the computing device 106 when the user device 102a is located within the premises 108. The parent may work a job that has the parent away from the premises 108 from approximately 8:30 AM to 5:30 PM Monday through Friday, which means the user device 102a is not connected to the wireless network from approximately 8:30 AM to 5:30 PM Monday through Friday. In contrast, the child may go to school from 8:00 AM to 3:00 PM Monday through Friday, which means the user device 102b is not connected to the wireless network from approximately from 8:00 AM to 3:00 PM Monday through Friday. The computing device 106 may store the times that the user devices 102a,b are, and are not, connected to the wireless network. The computing device 106 may store the data based on periods of time. For example, the computing device 106 may determine every 30 seconds whether or not the user devices 102a,b are, or are not, connected to the wireless network. As another example, the computing device 106 may determine the times that the user devices 102a,b are, or are not, connected to the wireless network in a longer period of time such as one day and/or one week.

The computing device 106 may collect and store data associated with a plurality of known user devices. A known user device may be a user device that has one or more labels and/or characteristics associated with the known user device. For example, labels and/or characteristics may be specifications associated with the known user device such as memory, processing power, memory size, screen size, make, model, and so forth. Additionally, the labels and/or characteristics may be associated with a user of the known user device such as demographic information (e.g., age, location, profession, etc.) associated with the user. The computing device 106 may collect and store data from a plurality of premises 108 that each have one or more known user devices 102. The computing device 106 may collect and store this data to determine a training data set to train a machine learning module to determine one or more labels and/or characteristics associated with an unknown device.

The computing device 106 may determine a probability that the user device 102a is connected to the wireless network, and may determine a probability that the user device 102b is connected to the wireless network. The computing device 106 may determine a time pattern model to determine the repetitive pattern of each of the user devices' 102a,b telemetry values (e.g., a repetitive pattern of "connected vs. not connected," repetitive pattern of "number of bytes downloaded," etc.). The time pattern model indicates the probability that a user device is connected to the wireless network at a point in time. The time pattern model may have one or more functions associated with the time pattern model. For example, the time pattern model may be a model that has a sine function and a cosine function. The time pattern model may be associated with one or more coefficients. The one or more coefficients may represent the significance (e.g., the impact, the weight, the influence, etc.) of each of the periodic components (e.g., the time of day, the time of week) of the time pattern model. As an example, the sine function may have a respective coefficient, and the cosine function may have a respective coefficient as well. The coefficients may indicate the weight (e.g., significance) of the respective function in fitting the time pattern model to the probability that the user device is connected to the network. As an example, the cosine function may not be a good indicator of whether or not the user device is connected to the wireless network. Thus, the coefficient of the cosine function may have a low value to reduce the influence of cosine function in determining whether the user device is connected to the wireless network. In contrast, the sine function may be a good indicator of whether or not the user device is connected to the wireless network. Thus, the coefficient of the sine function may have a high value to increase the influence of the since function in determining whether the user device is connected to the wireless network. The coefficients may have any value (e.g., from 0 to 1, 0 to 100, etc.).

The computing device 106 may determine one or more coefficients that indicate a probability that a user device is connected to the network associated with the network device 104. The user device 102 may have a periodicity associated with the user device being connected to network that can be described with sinusoidal functions (e.g., sine, cosine, etc.). A sinusoidal function can be characterized (e.g., identified, determined, etc.) based on coefficients associated with the sinusoidal function. For example, the sinusoidal function may be characterized by a period of the sinusoidal function, a phase of the sinusoidal function, and an amplitude of the sinusoidal function. A model may be fit based on the data of when the user device 102 is connected to determine the coefficients for the sinusoidal function. As an example, the following model may be used:

$$\mu(t) = \mu + \lambda_d \sin\left(\phi_d + t\frac{2\pi}{D}\right) + \lambda_w \sin\left(\phi_w + t\frac{2\pi}{W}\right)$$

In the example model above, t is the time in seconds since the epoch, D is the number of seconds in a single day, W is the number of second in a week, and the coefficients that need to be determined (e.g., characterized, fit, etc.) are: the baseline constant μ, the amplitude of the daily component $\lambda_d$, the amplitude of the weekly component $\lambda_w$, the phase of the daily component $\Phi_d$, and the phase of the weekly component $\Phi_w$. These coefficients may be determined by utilizing Fourier analysis to fit the sinusoidal function to the times that the user device 102 is connected to the network. The analysis will determine the coefficients that indicate the probability that the user device is connected to the wireless network associated with the network device 104. As will be appreciated by one skilled in the art, there are multiple methods to determine fitted coefficients and the present disclosure should not be limited to Fourier analysis.

The computing device 106 may determine coefficients of a sine function and a cosine function associated with a first period (e.g., a 24 hour period of time that represents a day). The computing device 106 may determine the coefficients for the first period of time utilizing the following equations: Cos(2*pi*t/SECONDS_IN_1DAY) and Sin(2*pi*t/SECONDS_IN_1DAY). The computing device 106 may determine the coefficients for a second period of time (e.g., a 168 hour period of time that represents a week) utilizing the following equations: Cos(2*pi*t/SECONDS_IN_1WEEK), and Sin(2*pi*t/SECONDS_IN_1WEEK). The computing device 106 may determine the coefficients of the periodic components for the user device 102a and the user device 102b. The coefficients may indicate the weight (e.g., the importance) of the respective functions. The coefficients may indicate the probability that the user devices 102 are connected to the wireless network associated with the network device 104.

Additionally, an association (e.g., correlation, coordination, etc.) between the coefficients of the sine vs. the cosine components of the same period may be meaningful to represent the typical peak time of the repetitive pattern. For example, an adult's phone may have a peak "activity" (e.g., probability of being "connected," number of bytes downloaded, etc.) around midnight every day. This may result in a fitted time model with a strong cosine component of the 1 day period, but close to zero sine component of 1 day period, causing the peak to be around midnight. Accordingly, the coefficients associated with the cosine component of the 1 day period may indicate a high weight value associated with the cosine component, whereas the sine component may have a low weight value. On the other hand, a different user device may be used by a child and still have strong daily periodicity, but with a peak time around 6 pm. Applying a time model for this child device may also result in strong magnitude for the 1 day period coefficients but with a different balance between sine and cosine components. That is, a stronger coefficient for the sine and a weaker coefficient for the cosine. Thus, coefficients for both the sine and cosine components may be utilized to distinguish between different user devices (e.g., to distinguish a child's device vs. an adult's device). Accordingly, the computing device 106 may determine associations based on the value of these coefficients. For example, the computing device 106 may utilize the coefficients to compare different devices to one another in a meaningful way (e.g., devices with similar/close coefficients have similar repetitive time patterns) or to be used as input features to a classifier for various characteristics (e.g., "mobile vs. stationary", "child device vs. adult device", etc.).

The computing device 106 may determine a vector (e.g., a feature vector) for each of the user devices 102a,b,c. For example, each of the coefficients determined for each of the user devices 102a,b,c may be used to determine a respective vector for each of the user devices 102a,b,c. For example, if the computing device 106 is fitting a time model to predict "connected vs. not connected" and a time model to predict "number of bytes downloaded" (both with sine and cosine of 1 day and 1 week periods), the computing device 106 may assemble a vector with 10 features: the 5 coefficients from the "connected vs. not connected" time model and 5 coefficients from the "number of bytes downloaded" time model. The vector may represent the respective user device's time patterns.

The vector may be used to compare the user device to another user device or to infer characteristics of the device (e.g., adult vs. child, mobile vs. stationary, etc.). For example, the vector of one of the user devices 102 may be utilized by the computing device 106 to determine one or more vectors that have similar coefficients associated with the vector. The one or more vectors may be associated with previously known user devices 102. Additionally, the one or more vectors may be associated with one or more characteristics of the previously known user devices 102. Thus, the computing device 106 may utilize the one or more vectors to determine (e.g., infer) one or more characteristics of a specific user device 102 and/or a user associated with the specific user device 102. Accordingly, the computing device 106 may utilize the vector of each of the user devices 102a,b,c to determine one or more characteristics of the user devices 102a,b,c.

Returning to the above example of the parent and child, the computing device 106 may determine a vector of the user device 102a. The vector may indicate one or more characteristics of the user of the user device. That is, the vector may indicate that the vector is associated with a parent who works 8:30 AM to 5:30 PM Monday through Friday, which aligns with the characteristics of the user of the user device 102a. Thus, the computing device 106 can infer that the user device 102a is associated with a parent. Accordingly, the computing device may identify the user device 102a as a device associated with a parent based on the vector associated with the user device 102a. Similarly, the computing device 106 may determine a related vector for the user device 102b that indicates that the user device 102b is associated with a child. Thus, the computing device 106 can identify the user device 102b as being associated with the child based on the vector associated with the user device 102b.

The computing device 106 can determine the characteristics of the user devices 102a,b,c without access the contents of data sent by the user devices 102a,b,c. For example, the vector for the user device 102a and the vector for the user device 102b may be determined without accessing the content of the data sent by the respective user devices 102a,b. As an example, the vector may be based on the times that the user devices 102a,b,c are connected with the network device 104. The computing device 106 may determine the times that the user devices 102a,b,c are connected to the network device 104 without needing to access the data sent by the user devices 102a,b,c. Further, the computing device 106 may determine the amount of data that the user devices 102 send via the network associated with the network device 104 without needing to access the data sent by the user devices 102. That is, the network device 104 may monitor the amount of data being sent by the user devices 102a,b,c without determining the content of the data being sent by the user devices 102a,b,c. Thus, neither the computing device 106, nor the network device 104, need to access the data (e.g., determine the content of the data) sent by the user devices 102a,b,c to determine the times that the user devices 102a,b,c are connected to the network associated with the network device 104, as well as the amount of data sent by the user devices 102a,b,c via the network associated with the network device 104. Accordingly, the privacy of the data associated with the user devices 102a,b,c is maintained even though the computing device 106 is capable of determining one or more characteristics of the user devices 102a,b,c.

The computing device 106 may determine that the user devices 102a,b,c are a type of device. The computing device 106 may utilize the MAC address of the user devices 102a,b,c, along with the vector associated with the user devices 102a,b,c, to determine the type of device of the user devices 102. The type of device may include the make, model, manufacturer, etc. The computing device 106 may utilize the MAC address to determine the manufacturer of the user devices, but the manufacturer does not indicate what the specific devices are. For example, two laptops that are made by the same manufacturer may have the same MAC address even though specifications of the laptops are not identical. The computing device 106 can utilize the vector, which indicates the usage of the user devices 102a,b,c, along with the MAC address of the user devices 102a,b,c, to determine what type of model the device is. For example, the user device 102a may be a smartphone built by a manufacturer, and the user device 102c may be a laptop built by the same manufacturer. Thus, the user device 102a and the user device 102c may have the same MAC address. However, the user devices 102a,c may not be used the same way. Stated differently, the vectors associated with the user devices 102a,c may be different. For example, user device 102c (e.g., the laptop) may be connected to the network (e.g., the network associated with the network device 104) and may send/receive data via the network for a couple hours each day, but the user device 102c may be disconnected from the network the rest of the time. In contrast, the user device 102a (e.g., the smartphone) may be connected with the network while the user is in the home and is used regularly while the user is home. Thus, the vector associated with the user device 102a (e.g., the smartphone) is going to be different than the vector associated with the user device 102c (e.g., the laptop) because the user may use the smartphone differently than the way the user uses the laptop.

The computing device 106 may compare the vector of the user devices 102a,c to previously determined vectors to determine the identities of the devices. The computing device 106 may compare the vectors of the user devices 102a,c to other vectors associated with devices of the manufacturer. The computing device 106 may determine, based on a related vector, that the user device 102a is a smartphone of the manufacturer. Similarly, the computing device 106 may determine, based on a related vector, that the user device 102c is a laptop of the manufacturer. Thus, the computing device 106 may identify the user device 102a as a smartphone of the manufacturer, and may identify the user device 102c as a laptop of the manufacturer.

The computing device 106 may determine one or more identifiers and/or labels for the user devices 102a,b,c. For example, the computing device 106 may determine the one or more identifiers and/or labels for the user devices based on one or more characteristics of the user devices 102a,b,c and/or the characteristics of the users of the user devices 102a,b,c. The one or more labels may be associated with one or more characteristics of the user devices 102a,b,c. As an example, a label of "smartphone model 1 of manufacturer A" may be associated with the specifications (e.g., memory, processor, size, screen size, MAC address, year manufactured, etc.) of the smartphone model 1 of manufacturer A. The computing device 106 may store the determined labels of the user devices 102a,b,c. For example, the user device 102a may be determined to be a smartphone associated with an adult. The computing device 106 may determine an appropriate label based on this information. As an example, the computing device 106 may identify and/or label the device 102a as an adult's smartphone.

The determined labels may be associated with a user account. For example, the computing device 106 may be associated with a user account. The labeled (e.g., identified) devices that are communicating with the network device 104 may be determined to be associated with the user account. The computing device 106 may only identify devices that regularly communicate with the network device 104 as being associated with the user account. For example, the computing device 106 may only identify devices as being associated with the account if the devices satisfy a threshold. As an example, for a device to be considered associated with an account, the device may need to connect with the network device 104 on a regular basis for a set number of days (e.g., 2, 3, 10, etc.). The threshold may be determined by the user associated with the user account. If the user device does not satisfy the threshold, the computing device 106 may identify and/or label the device as a guest device.

Figure 2:
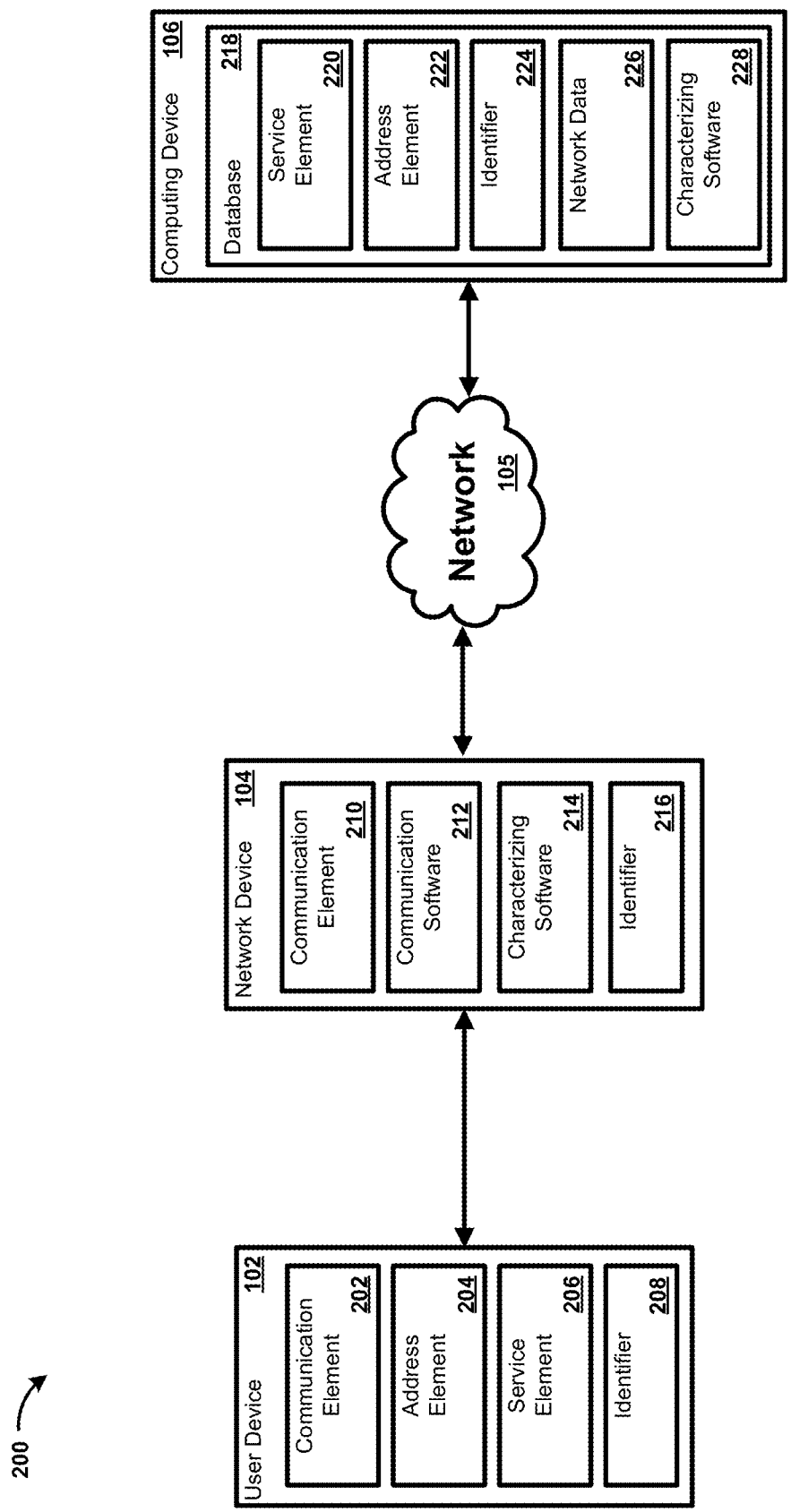
FIG. 2 shows an example system for wireless communication.

FIG. 2 shows a system 200 for wireless communication. The system 200 may have a user device 102, a network device 104, and a computing device 106. The network device 104 may facilitate the connection of a device, such as the user device 102, to a network (e.g., a wireless network).

The user device 102 may have a communication element 202, an address element 204, a service element 206, and an identifier 208. The user device 104 may be an electronic device such as a computer, a smartphone, a laptop, a tablet, a set top box, a display device, or other device capable of communicating with the network device 104. The communication element 202 may be a wireless transceiver configured to transmit and receive wireless communications via a wireless network (e.g., Wi-Fi). The communication element 202 may be configured to communicate via one or more wireless networks. The communication element 202 may be configured to communicate via a specific network protocol. The user device 102 may communicate with the network device 104 via the communication element 202.

The user device 102 may have an address element 204 and a service element 206. The address element 204 may comprise or provide an internet protocol address, a network address, a media access control (MAC) address, an Internet address, or the like. The address element 206 may be relied upon to establish a communication session between the user device 102 and the network device 104 or other devices and/or networks. The address element 204 may be used as an identifier or locator of the user device 102. The address element 204 may be persistent for a particular network.

The service element 206 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 206 may comprise information relating to or provided by a communication service provider (e.g., Internet service provider) that is providing or enabling data flow such as communication services to the user device 102. The service element 206 may comprise information relating to a preferred service provider for one or more particular services relating to the user device 102. The address element 204 may be used to identify or retrieve data from the service element 206, or vice versa. The one or more of the address element 204 and the service element 206 may be stored remotely from the user device 102. Other information may be represented by the service element 214.

The user device 102 may be associated with a user identifier or device identifier 208. The device identifier 208 may be any identifier, token, character, string, or the like, for differentiating one user or computing device (e.g., the computing device 106) from another user or computing device. The device identifier 208 may identify a user or computing device as belonging to a particular class of users or computing devices. The device identifier 208 may comprise information relating to the user device 102 such as a manufacturer, a model or type of device, a service provider associated with the user device 102, a state of the user device 102, a locator, and/or a label or classifier. Other information may be represented by the device identifier 208. The device identifier 208 may be assigned to the user device 102 by the network device 104 and/or the computing device 106. The network device 104 and/or the computing device 106 may determine characteristics of the user device 102 by comparing time pattern coefficients associated with the user device 102 to a plurality of user devices' coefficients to characterize (e.g., classify, identify) the user device 102.

The network device 104 may have a communication element 210, communication software 212, characterizing software 214, and an identifier 216. The network device 104 may be configured as a local area network (LAN). The network device 104 may be a wireless communication device. The network device 104 may be a gateway device for communicating with another network, such as a communication network provided by an Internet Service Provider. The network device 104 may be configured with a first service set identifier (SSID) (e.g., associated with a user network or private network) to function as a local network for a particular user or users. The network device 104 may be configured with a second SSID (e.g., associated with a public/community network or a hidden network) to function as a secondary network or redundant network for connected communication devices. The network device 104 may be configured to allow one or more wireless devices to connect to a wired and/or wireless network using Wi-Fi, Bluetooth or any desired method or standard.

The network device 104 may have communication software 212. The communication software 212 may be any combination of firmware, software, and/or hardware. The communication software 212 may facilitate the network device 104 communicating with the user device 102 and/or the computing device 106. For example, the network device 104 may facilitate the user device communicating with the network 105. That is, the user device 102 may communicate with the network 105 via the network device 104.

The network device 104 may have characterizing software 214. The characterizing software may identify devices (e.g., the user device 102) based on the device's interactions with the network device 104 (e.g., the time connected to the network, the download/upload byte counts, etc.). The characterizing software 214 may label and/or identify the devices based on telemetry measurements sampled at different times. The characterizing software 214 may determine time pattern coefficients for the device that indicate when the device is connected to the wireless network.

The characterizing software 214 may determine one or more labels for the user devices 102a,b,c. The characterizing software 214 may determine the labels for the user devices based on one or more characteristics of the user devices 102a,b,c and/or the characteristics of the users of the user devices 102a,b,c. The one or more labels may be associated with one or more characteristics of the user devices 102a, b,c. As an example, a label of "smartphone model 1 of manufacturer A" may be associated with the specifications (e.g., memory, processor, size, screen size, MAC address, year manufactured, etc.) of the smartphone model 1 of manufacturer A. The characterizing software 214 may store the determined labels of the user devices 102a,b,c and/or the determined labels of the users of the user devices 102a,b,c. The characterizing software 214 may provide the determined labels to the computing device 106. For example, the user device 102a may be determined to be a smartphone associated with an adult. The characterizing software 214 may determine an appropriate identifier and/or label based on this information. As an example, the network device 104 may identify and/or label the device 102a as an adult's smartphone.

The determined labels may be associated with a user account. For example, the network device 104 may be associated with a user account. The user devices 102a,b,c that are communicating with the network device 104 may be determined to be associated with the user account. The characterizing software 214 may only label devices that regularly communicate with the network device 104 as being associated with the user account. For example, the characterizing software 214 may only label devices as being associated with the account if the device connections satisfy a threshold. As an example, for a device to be considered associated with an account, the device may need to connect with the network device 104 on a regular basis for a set number of days (e.g., 2, 3, 10, etc.). The threshold may be determined by the user associated with the user account. If the user device does not satisfy the threshold, the network device 104 may identify and/or label the device as a guest device.

The communication element 210 may be a wireless transceiver configured to transmit and receive wireless communications via a wireless communication. The communication element 210 may be configured to communicate via a specific network protocol. The communication element 210 may be a wireless transceiver configured to communicate via a Wi-Fi network. The network device 104 may communicate with the user device 102 and/or the computing device 106 via the communication element 210.

The network device 104 may have an identifier 216. The identifier 216 may be or relate to an Internet Protocol (IP) Address IPV4/IPV6 or a media access control address (MAC address) or the like. The identifier 216 may be a unique identifier for facilitating wired and/or wireless communications with the network device 104. The identifier 216 may be associated with a physical location of the network device 104.

The computing device 106 may have a database 216, a service element 220, an address element 222, an identifier 224, network data 226, and characterizing software 228. The computing device 106 may manage the communication between the user device 102 and a database 218 for sending and receiving data there between. The database 218 may store a plurality of files (e.g., web pages), user identifiers or records, or other information. The user device 102 may request and/or retrieve a file from the database 218. The database 218 may store information relating to the user device 102 such as the address element 204 and/or the service element 206. The computing device 106 may obtain the device identifier 208 from the user device 102 and retrieve information from the database 218. The computing device 106 may assign the identifier 208 to the user device 102. Any information may be stored in and retrieved from the database 218. The database 218 may be disposed remotely from the computing device 104 and accessed via direct or indirect connection. The database 218 may be integrated with the computing device 104 or some other device or system.

The computing device 106 may have a service element 220. The service element 220 may comprise an identification of a service provider associated with the computing device 106 and/or with the class of computing device 106. The class of the computing device 106 may be related to a type of device, capability of device, type of service being provided, and/or a level of service (e.g., business class, service tier, service package, etc.). The service element 220 may comprise information relating to or provided by a communication service provider (e.g., Internet service provider) that is providing or enabling data flow such as communication services to the computing device 106. The service element 220 may comprise information relating to a preferred service provider for one or more particular services relating to the computing device 106. Other information may be represented by the service element 214.

The address element 222 may comprise or provide an internet protocol address, a network address, a media access control (MAC) address, an Internet address, or the like. The address element 222 may be relied upon to establish a communication session between the computing device 106 and the network device 104 or other devices and/or networks. The address element 222 may be used as an identifier or locator of the computing device 106. The address element 222 may be persistent for a particular network.

The computing device 106 may have an identifier 224. The identifier 224 may be or relate to an Internet Protocol (IP) Address IPV4/IPV6 or a media access control address (MAC address) or the like. The identifier 224 may be a unique identifier for facilitating wired and/or wireless communications with the network device 104. The identifier 224 may be associated with a physical location of the computing device 106.

The computing device 106 may store network data 226 in the database 218. The network data 226 may be a plurality of vectors associated with a plurality of devices. The network data 226 may indicate one or more characteristics of the devices. Each vector may be associated with a specific device. The computing device 106 may utilize the network data 226 to determine characteristics of a device based on one or more coefficients associated with the device. The network data 226 may indicate a correlation between coefficients and a user. The network data 226 may indicate demographic information of a user associated with a vector. The network data 226 may have additional data related to network communications. The computing device 106 may determine the demographics of a user from the network data 226 based on the coefficients of the user's devices.

The computing device 106 may have characterizing software 228. The characterizing software 228 may characterize devices (e.g., the user device 102) based on the devices interactions with the network device 104 (e.g., the time connected to the network, the download/upload byte counts, etc.). The characterizing software 228 may identify the devices based on telemetry measurements sampled at different times. The characterizing software 228 may determine a probability that the device is connected to the wireless network. The characterizing software 228 may determine the probability for one or more periods of time (e.g., a day, a week, a month, etc.). The characterizing software 228 may determine the probability utilizing a sine function and a cosine function associated with a first period (e.g., a day). The characterizing software 228 may determine the probabilities for the first period of time utilizing the following equations: Cos(2*pi*t/SECONDS_IN_1DAY) and Sin(2*pi*t/SECONDS_IN_1DAY). The characterizing software 228 may determine the probabilities for the second period of time utilizing the following equations: Cos(2*pi*t/SECONDS_IN_1WEEK), and Sin(2*pi*t/SECONDS_IN_1WEEK). The characterizing software 228 may determine one or more coefficients associated with the probabilities to identify and/or label the devices.

Figure 3A:
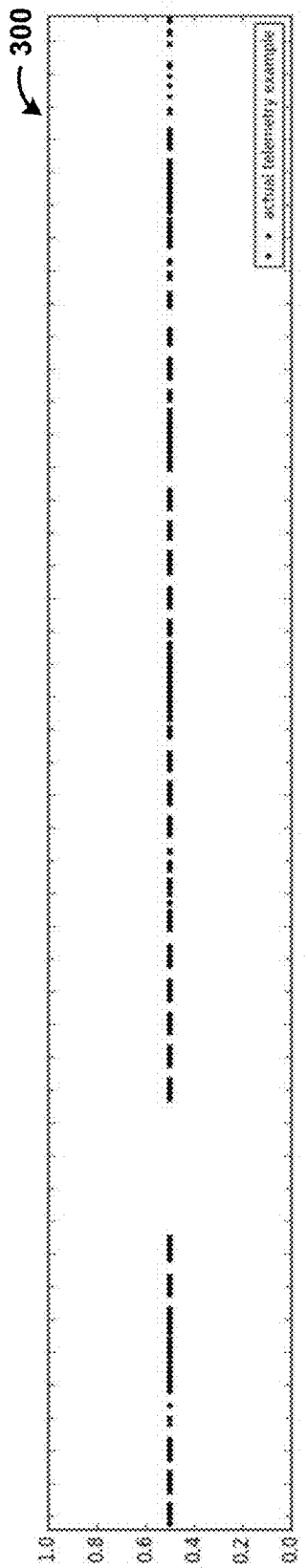
FIGS. 3A-3C show diagrams of example times a device is connected to a wireless network.
Figure 3B:
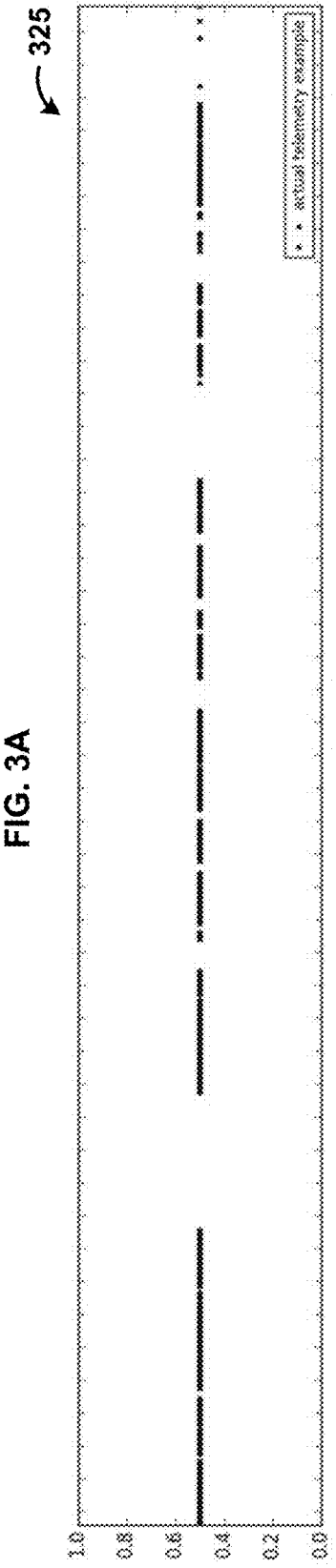
Figure 3C:
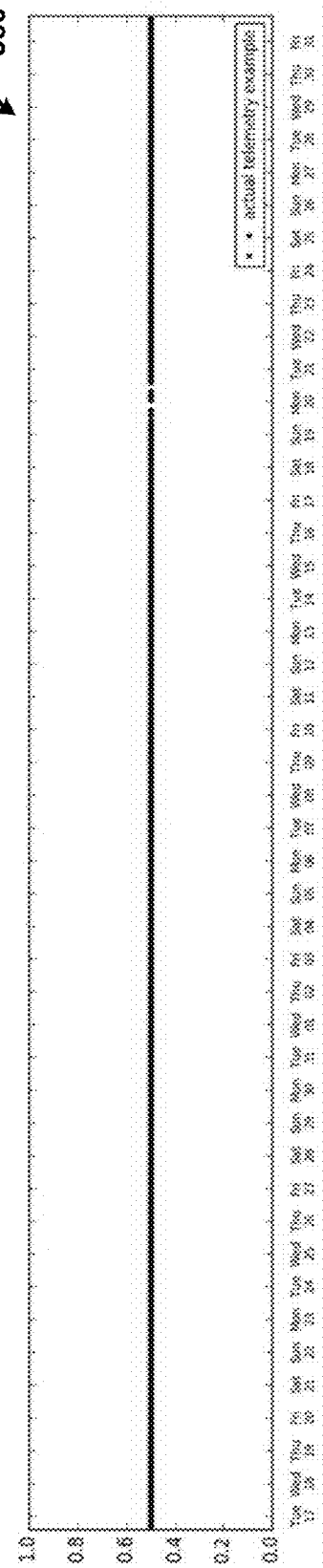

FIGS. 3A-3C show diagrams of times a device is connected to a wireless network. FIG. 3A shows a diagram 300. The diagram 300 indicates the times that a user device (e.g., the user devices 102 of FIGS. 1 & 2) is connected with a network. Specifically, the diagram 300 indicates the time each hour, indicated by individual dots, that the user device is connected to the network. The diagram 300 represents the times that a smartphone is connected to the network. FIG. 3B shows a diagram 325. The diagram 325 indicates the times that a user device (e.g., the user device 102 of FIGS. 1 & 2) is connected with a network. Specifically, the diagram 325 indicates the time each hour, indicated by individual dots, that the user device is connected to the network. The diagram 325 represents the times that a child's tablet is connected to the network. FIG. 3C shows a diagram 350. The diagram 350 indicates the times that a user device (e.g., the user device 102 of FIGS. 1 & 2) is connected with a network. Specifically, the diagram 350 indicates the time each hour, indicated by individual dots, that the user device is connected to the network. The diagram 350 represents the times that an IoT device (e.g., a thermostat) is connected to the network.

FIG. 4A-4C show diagrams of periodic probabilities. Specifically, FIGS. 4A-4C represent a predictive model that was applied to the data of FIGS. 3A-3C. The predictive model may be a linear predictive model (e.g., a logistic regression classifier). The predictive model may be applied to the data from a single device. The predictive model may be represented with 9 numbers (e.g., 9 coefficients) that describe how to linearly combine 8 time component values when predicting "connected vs. not connected," as well as a coefficient to represent for bias. The 9 coefficients may be the coefficients that may be used later to compare the device to other devices or to classify the device's characteristics. For example, the 9 coefficients may be associated with a vector that may be used to characterize the device. The predictive model can indicate (e.g., predict) the probability of "connected" for any new time point that is supplied to the predictive model. Thus, the data of FIGS. 3A-3C was input into the predictive model to produce the diagrams shown in FIGS. 4A-4C.

FIG. 4A shows a diagram 400. The diagram 400 represents a probability determined from the diagram 300 of FIG. 3A. The diagram 400 represents a fitted predicted value (e.g., probability of "connected") for one user device (e.g., the user device 102). The fitted predicted value for the user device is associated with a plurality of coefficients that indicate the probability that the user device is connected to network. In the diagram 400, the fitted coefficients (e.g., the determined coefficients) have a stronger magnitude for the cosine component of 1 day period (e.g., much stronger compared to the intercept component). The result is a predicted value (e.g., probability of "connected") with a strong daily periodicity. Specifically, the daily periodicity may have a highest value around midnight every day, and lowest value around midday. Based on this predicted probability, one or more characteristics of the device may be determined. For example, the device associated with the diagram 400 may be a smartphone. A user associated with the smartphone may take the smartphone to work every day. Thus, the smartphone is disconnected from the network during most days (e.g., Monday through Friday), and is connected with the network most nights (e.g., when the user comes home from work).

FIG. 4B shows a diagram 425. The diagram 425 represents a probability determined from the diagram 325 of FIG. 3B. The diagram 425 represents a fitted predicted value (e.g., probability of "connected") for one user device (e.g., the user device 102). The fitted predicted value for the user device is associated with a plurality of coefficients that indicate the probability that the user device is connected to network. The diagram 425 represents a fitted predicted value (e.g., probability of "connected") for one user device (e.g., the user device 102) that has a predicted value (e.g., probability of "connected") with a strong weekly periodicity. Specifically, the weekly periodicity may have a highest value on Monday through Thursday each week, and lowest value around Friday through Sunday of each week. Based on this predicted probability, one or more characteristics of the device may be determined. For example, the device associated with the diagram 425 may be a laptop. A user associated with the laptop may use the laptop at night when the user returns from work. Thus, the laptop is connected with the network the most from Monday through Thursday (e.g., when the user comes home from work) and is disconnected from the network during on the weekends (e.g., Friday through Sunday).

FIG. 4C shows a diagram 450. The diagram 450 represents a probability determined from the diagram 350 of FIG. 3C. The diagram 450 represents a fitted predicted value (e.g., probability of "connected") for one user device (e.g., the user device 102). The fitted predicted value for the user device is associated with a plurality of coefficients that indicate the probability that the user device is connected to network. The diagram 450 represents the fitted predicted value (e.g., probability of "connected" to a network) that indicates a flat function. That is, the user device has a probability close to 1 of "connected" at all times regardless of time of day or time of week. In the diagram 450, the fitted coefficients have a very strong intercept component, much stronger than all the coefficients of sine and cosine for the 1 day and the 1 week period. These coefficients indicate that the time model gives much weight to the constant value and very little regard to the time of day and time of week. Based on this predicted probability, one or more characteristics of the device may be determined. For example, the device associated with the diagram 400 may be an Internet of Things (IoT) device, such as a smart thermostat. The smart thermostat may have a permanently fixed location (e.g., attached to a wall). Thus, the smart thermostat may be constantly connected to the network because the smart thermostat does not leave the house, which is indicated by the predicted probability of the smart thermostat being connected to the network being close to 1.

Figure 5:
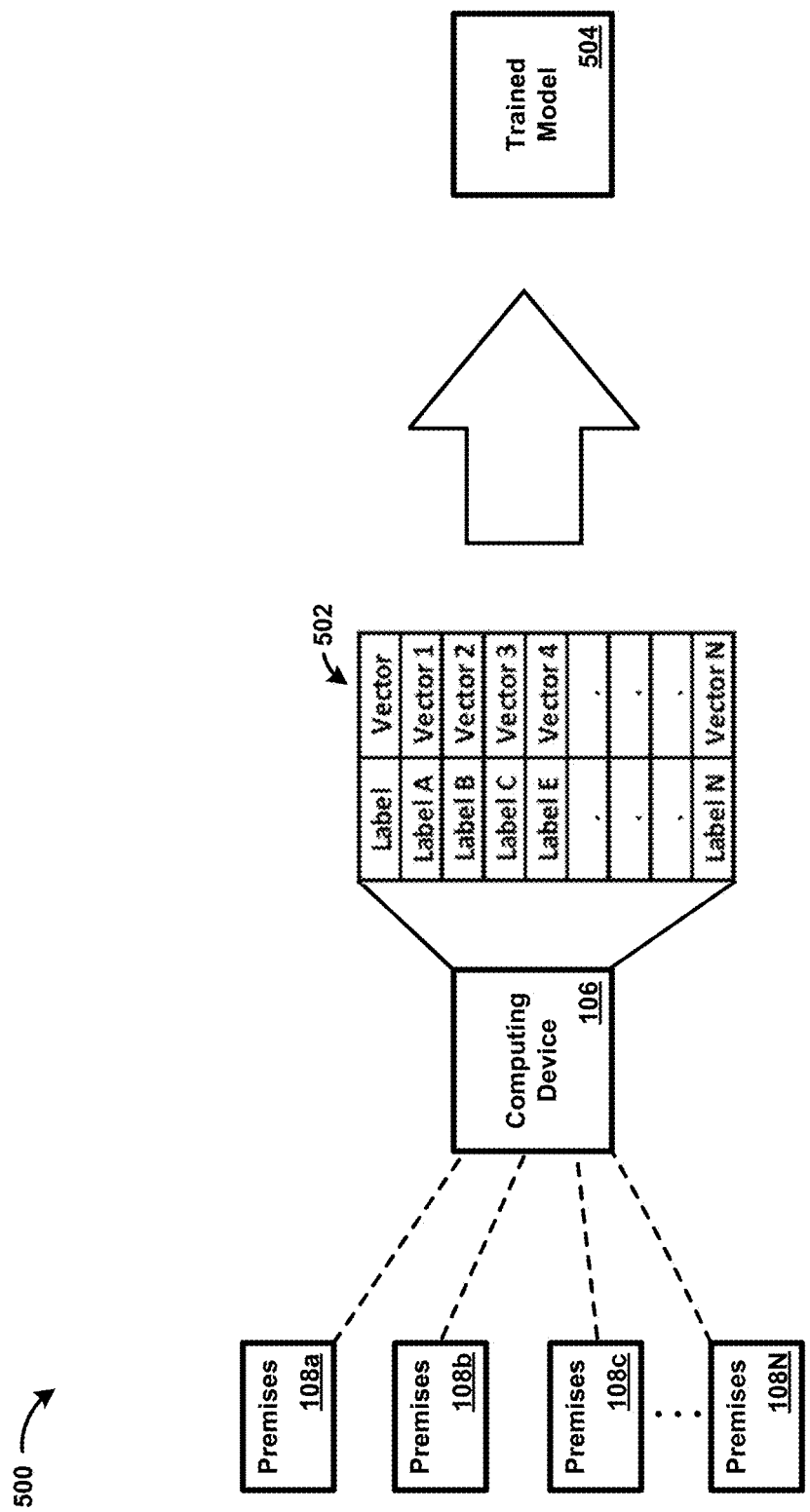
FIG. 5 shows an example system for machine learning.

FIG. 5 shows an example system 500 for machine learning. The system 500 has a plurality of premises 108 that may provide data to the computing device 106. For example, each of the premises 108 may have a plurality of devices (e.g., user devices) associated with each of the premises 108. Each of these plurality of devices may be known devices having one or more characteristics and/or labels. That is, the characteristics and/or labels for each of these devices may be known so that a training data set 502 may be created based on one or more telemetry variables associated with each of the devices. For example, data from each of the plurality of premises 108 may be collected that indicates when the plurality of known devices are connected to a network. The data may be used to determine a probability that the plurality of known devices are connected to the network. The probability may have one or more coefficients associated with the probability. For example, the coefficients may indicate the probability that a device is connected to the network. The coefficients may be added to a vector associated with each known device, as well as any labels associated with each known device. For example, the labels for each known device may be previously determined because these are known devices. Thus, the labels are associated with each vector that is associated with the known devices. Accordingly, the training data set 502 has a plurality of labels associated with a plurality of vectors for the plurality of known devices. The training data set 502 may be utilized in a first stage of machine learning to produce a trained model 504.

Each device in the training data set 502 may be represented as a vector based on a time model (e.g., classifiers, regressors, etc.). From the time model, linear weight coefficients and an intercept may be concatenated. For example, if time periods are 1 day an 1 week are used, there may be 5 features and/or coefficients (e.g., an intercept, a weight for cosine for a period of time of a week, a weight for a sine for a period of time of a week, a weight for cosine for a period of time of a day, and a weight for sine for a period of time of a day). These time model parameters may be modified with per period magnitude features. For example, the magnitude of the 1 day period would be square root (w1^2+ w2^2), if w1 and w2 are the weights of the cosine and sine components of the 1 day period. Further, all these features may be concatenated to form a single vector that characterizes the device as shown in the training data set 502. For example, 5 features and/or coefficients that indicate whether a device is "connected vs. not connected" may be combined with 5 coefficients that indicate an RSSI associated with the device, forming a single 10 dimensional vector to represent the device.

In an aspect, the computing device 106 may provide (e.g., supply, feed, etc.) a machine learning module with data associated with one or more user devices. For example, the computing device 106 may provide (e.g., supply, feed, etc.) the machine learning module with at least a portion of the training data set 502. For example, the computing device 106 may provide the machine learning module with the times that the user devices are connected with a network device at each of the premises 108. The machine learning module may determine one or more coefficients associated with the user devices based on the times that the user devices are connected to the network. The coefficients may indicate a probability that the user devices are connected to the network.

In an aspect, the computing device 106 may provide the machine learning module with the coefficients that indicate the probability that the device is connected with the network. In the first stage of machine learning, the machine learning module may be directed to learning characteristics for each device of a plurality of devices located at each of the premises 108 at a point in time. As an example, a data point may be a sample from a single time point associated with a single device, the input features are the sine and cosine values for the various periods, and the output (e.g., predicted) variable is the telemetry variable. For example, the computing device 106 may provide machine learning module with the training data set 502 that has one or more labels associated with a vector. As an example, the computing device 106 may apply a linear predictive model (e.g., a linear classifier, a linear regressor, etc.) that takes all the periodic components as input (e.g., sine of a period of time of one day, cosine of a period of time of one day, sine of a period of time of one week, cosine of a period of time of one week, etc.) and predicts a telemetry value (e.g., "connected or not", "number of bytes downloaded"). This model may be fitted by using all the measured examples one of the plurality of know devices associated with the premises 108. After fitting the linear predictive model, the fitted model's coefficients will describe how much importance/contribution each periodic component (e.g., sine of a period of time of one day) has when predicting the telemetry variable (e.g. "connected vs. not connected") based on of a period of time of one day, of a period of time of one week, etc. These coefficients are informative about how the known device is used by a user of the known device. These coefficients may be associated with (e.g., added to) a vector in the training data set 502. The computing device 106 may determine (e.g., collect) data for each of the plurality of known devices associated with each of the plurality of premises 108. For example, the computing device 106 may determine the training data set 502 based on the coefficients and/or vectors for each of the plurality of known devices associated with each of the plurality of premises 108.

In an aspect, the training data set 502 may be utilized to train a model to determine the trained model 504. If the variable (e.g., a telemetry variable) is binary (e.g., connected vs. not connected) or categorical (e.g., connected to 2.4 GHz vs. connected to 5 GHz vs. not connected), a linear classifier (e.g., logistic regression) may be trained to determine the patterns. If the variable is continuous/scalar (e.g., RSSI, download byte count), a linear regression (e.g., a regressor) may be trained, with fitting an intercept and with a regularizing term. For example, the linear regression may predict an expected value of the telemetry variable (e.g., RSSI, download byte count) at any given time. As another example, the linear classifier may determine the probability that a device is connected to a wireless network at a premises 108 at any point in time.

As an example of training the trained model 504, the trained model 504 may be a neural network with a single hidden layer (e.g., two linear transformations with an element wise non-linearity after each transformation). The neural network may be an input vector of 10 features (e.g., the coefficients from a device's time models for "connected vs. not connected" and for "RSSI"), has a single hidden layer with 5 nodes (e.g., hidden variables), and a single output node to predict the probability that the device belongs to an adult. The training data set 502 for this classifier model may have many data points (e.g., 100; 1000; 100,000,000; etc.) from the plurality of the known devices of each of the premises 108. Each data point may represent a single device, and each data point may have an input vector of size 10. An example label may indicate whether the device is a child device vs. adult device (e.g., 1 bit where "0" indicates child device and "1" indicates adult device). The parameters of such a classifier model may be the numbers required to describe the linear transformation from the 10 input features to the 5 hidden nodes (e.g., a weight matrix of dimension 10×5 and a bias vector of dimension 5), and the linear transformation from the 5 hidden nodes to the single output node (e.g., a weight vector of dimension 5 and a scalar bias value) which results in a total of 61 numbers. The training process (e.g., the first stage of machine learning) of this classifier utilizes the training data set 502 to find a combination of values for the 61 model parameters. That is, the parameter values may be determined that make the neural network predict the labels of the data accurately.

The trained model 504 may be classifier model (e.g., a Support Vector Machine (SVM), a logistic regression, a decision tree, a random forest, a neural network, etc.). A separate classifier may be trained for each characteristic and/or label to be determined for the device (e.g. a separate classifier for "phone vs. tablet vs. computer," separate classifier for "child device vs. adult device," etc.). As another example, a unified multi-task classifier (e.g., a multiple layer perceptron with hidden layers and multiple output variables) may be trained to predict all these characteristics and/or labels simultaneously. Any type of classifier may be used (e.g., a neural network with more hidden layers, a linear classifier, a random forest, etc.). Any suitable standard machine learning algorithm may be used. The classifier's parameters may be optimized (e.g., finding parameter values that will give accurate predictions).

After the classifier model is trained to produce the trained model 504, the trained model 504 may classify a new user device (e.g., a second stage of machine learning). The trained model 504 (e.g., a linear regressor or a linear classifier) may determine a time pattern of the telemetry variable for the new user device based on data associated with the new user device. The trained model 504 may receive as input the vectors described above (e.g., concatenation of coefficients from the time models of the device), and the label (e.g., output) may indicate one or more labels (e.g., characteristics) of the device (e.g. "phone vs. computer", "child device vs. adult device") associated with the vector. For example, after some time of collecting telemetry measurements from the new user device, the computing device 106 may fit time models to the new device's telemetry measurements. The coefficients determined by the computing device 106 from the time fitted models may be concatenated to form a vector. The determined vector may be input (e.g., fed) into the trained model 504, which may determine (e.g., output) the new user device's characteristics (e.g., "child device vs. adult device") and/or labels.

As an example, a time model to predict "connected vs. not connected" based on periods of 1 day and 1 week may be fitted (e.g., determined) for the new user device. The computing device 106 may determine 5 coefficients from this model. Additionally, a time model to predict "RSSI" value based on 1 day and 1 week may be fitted (e.g., determined) by the computing device 106 for the new user device, which may result in 5 additional coefficients for the device. After determining the 10 coefficients, the 10 coefficients may be input to the trained model 504. For example, the computing device 106 may provide the 10 coefficients to the trained model 504. The trained model 504 may be a neural network. As another example, the computing device 106 may comprise the neural network and applies the 10 coefficients to the neural network. The neural network may apply a first linear transformation that results in 5 numbers. The neural network may apply a non-linear function to the 5 numbers. The neural network may apply a second linear transformation to combine the 5 numbers to a single number. The neural network may apply a second non-linear function to get a probability value (e.g., the predicted probability that one or more labels and/or characteristics accurately describe the new user device).

While the computing device 106 is shown as being separate from the trained model 504, the computing device 106 may include the capabilities of the trained model 504. Stated differently, the computing device 106 may be configured to use the machine learning described above.

Figure 6:
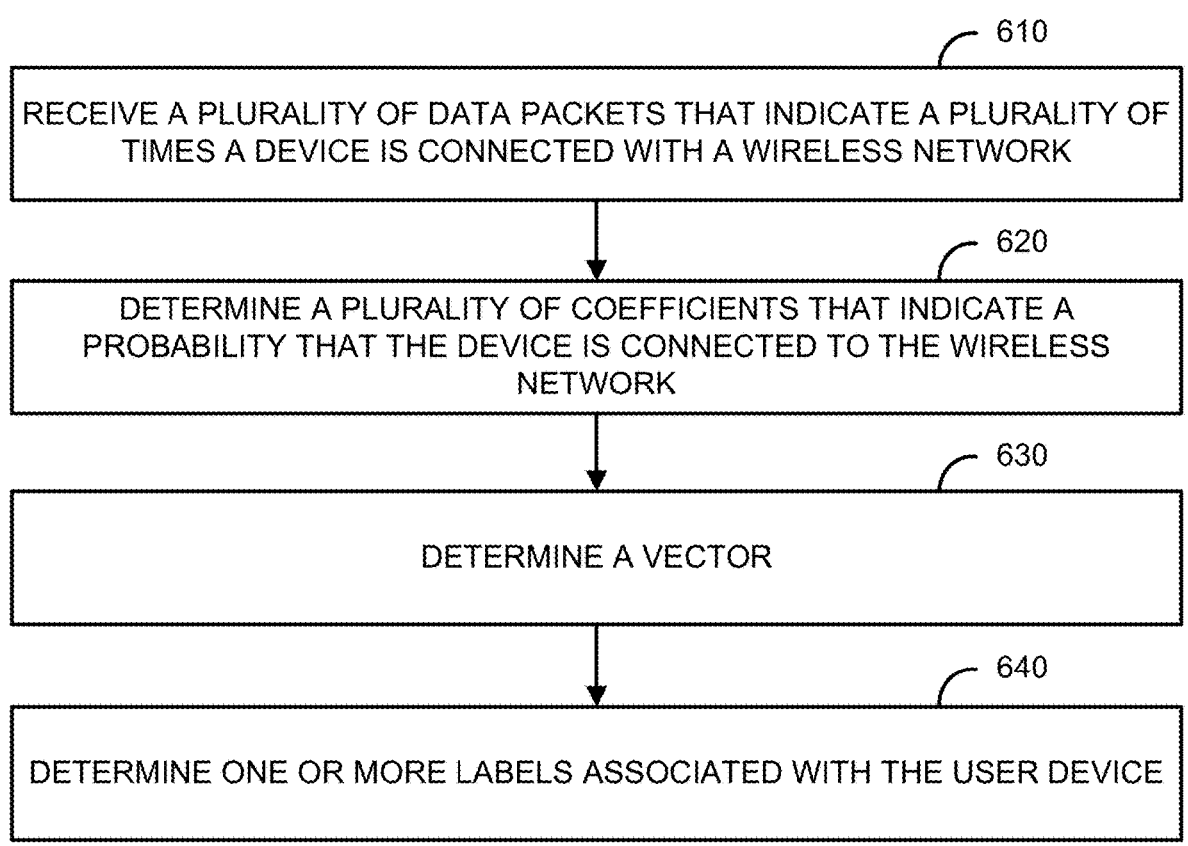
FIG. 6 shows a flowchart of an example method for characterizing a wireless device.

FIG. 6 is a flowchart of a method 600 for characterizing a wireless device. At step 610, a plurality of data packets that indicate a plurality of times that a device is connected with a wireless network are received. The plurality of data packets may be received by a network device (e.g., the network device 104 of FIGS. 1 & 2). The device may be another computing device (e.g., the user device 102 of FIGS. 1 & 2). The plurality of data packets may be received from the computing device. The plurality of times may be determined by the network device without inspecting the contents of the data packets. The plurality of data packets may be received by another computing device (e.g., the computing device 106 of FIGS. 1 & 2). For example, the network device may send the data packets to the another computing device. The plurality of data packets may be associated with the plurality of times. For example, each data packet of the plurality of data packets may be associated with a time stamp for when the data packet was sent and/or received by a device. As an example, each data packet may have a respective time stamp associated with it. As another example, a single data packet may indicate the plurality of times. The plurality of times may be determined by the network device without inspecting the contents of the data packets. The plurality of data packets may be received by another computing device (e.g., the computing device 106 of FIGS. 1 & 2). For example, the network device may send the data packets to the another computing device.

At step 620, a plurality of coefficients that indicate a probability that the device is connected to the wireless network is determined. The network device and/or the another computing device may determine the plurality of coefficients that indicate a probability that the device is connected to the wireless network. The plurality of coefficients may be based on a time period associated with the plurality of times. The network device may send the data that indicates the plurality of times the user device is connected to the wireless network to another device (e.g., the computing device 106 of FIGS. 1 & 2). The network device may receive the plurality of coefficients. The network device may receive the plurality of coefficients based on sending the data to the another device.

At step 630, a vector is determined. The network device and/or a computing device may determine the vector based on the plurality of coefficients. The vector may be a feature vector. The vector may comprise the plurality of coefficients to represent the probability that the user device is connected to a network. For example, if a time model to predict "connected vs. not connected" (with a sine and a cosine of 1 day and 1 week periods), the vector may have 5 features that comprise the 5 coefficients from the "connected vs. not connected" time model. Accordingly, the vector may represent the respective user device's usage patterns of the user device.

At step 640, one or more labels associated with the user device are determined. The one or more labels may be associated with one or more characteristics of the user device. As an example, a label of "smartphone model 1 of manufacturer A" may be associated with the specifications (e.g., memory, processor, size, screen size, MAC address, year manufactured, etc.) of the smartphone model 1 of manufacturer A. The one or more labels may be determined without inspecting the contents of the data packets. The network device may determine inferential demographics associated with a user of the user device based on the demographics of the one or more previously identified users. The network device may determine a specific user of a plurality of users associated with a user account. The specific user may be determined based on the inferential demographics of the user of the user device. The network device may associate the specific user with the device.

Figure 7:
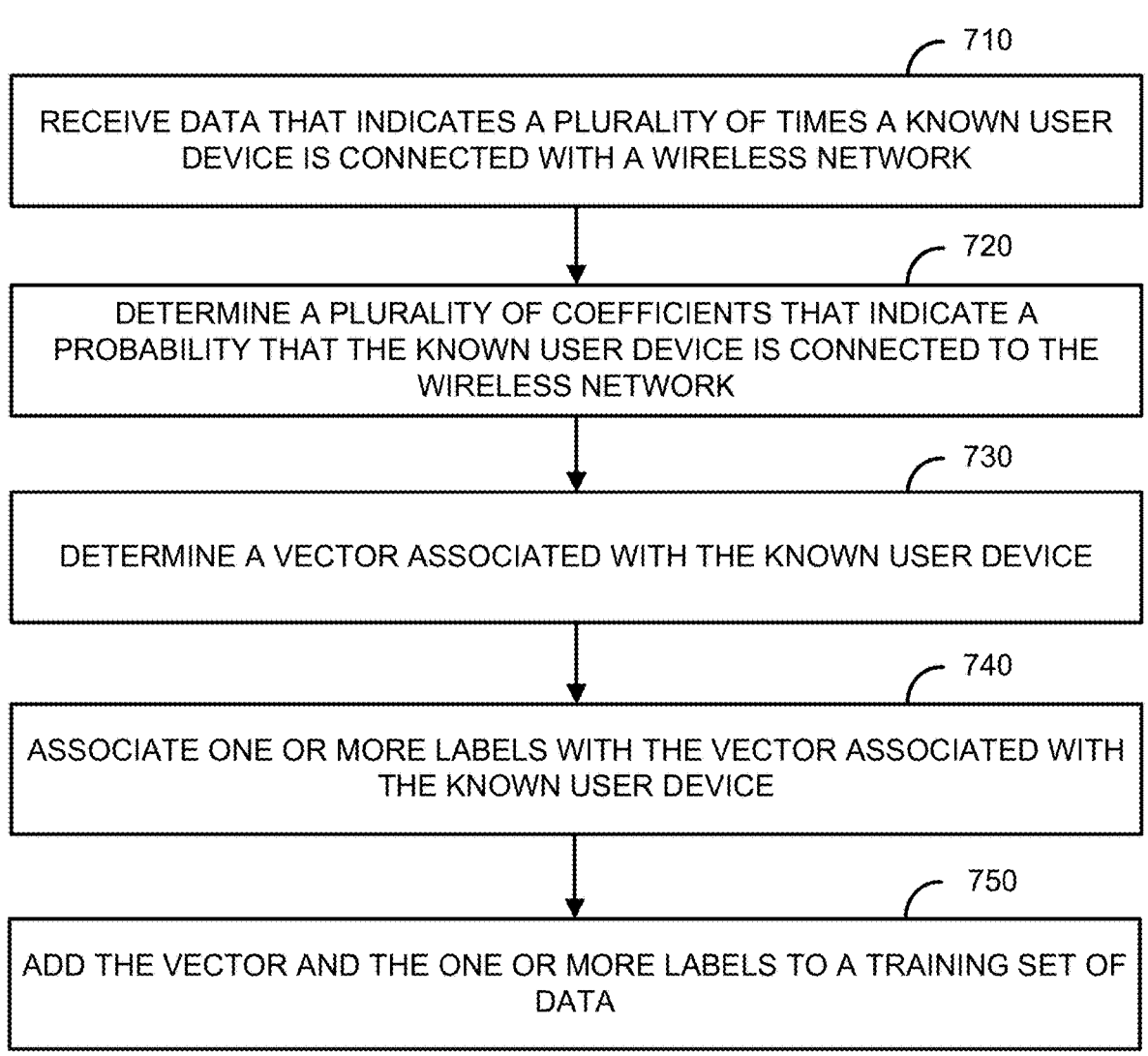
FIG. 7 shows a flowchart of an example method for characterizing a wireless device.

FIG. 7 is a flowchart of a method 700 for characterizing a wireless device. At step 710, data that indicates a plurality of times a known device is connected with a wireless network is received. The data packets may be received by a computing device (e.g., the computing device 106 of FIGS. 1 & 2). The computing device may receive the data from a network device (e.g., the network device 104 of FIGS. 1 & 2). The device may be a computing device (e.g., the user device 102 of FIGS. 1 & 2). The plurality of times may be determined by the network device without inspecting the contents of data packets. The plurality of data packets may be associated with the plurality of times. For example, each data packet of the plurality of data packets may be associated with a time stamp for when the data packet was sent and/or received by a device. As an example, each data packet may have a respective time stamp associated with it. As another example, a single data packet may indicate the plurality of times. The plurality of times may be determined by the network device without inspecting the contents of the data packets. The plurality of data packets may be received by another computing device (e.g., the computing device 106 of FIGS. 1 & 2). For example, the network device may send the data packets to the another computing device.

At step 720, a plurality of coefficients that indicate a probability that the known device is connected to the wireless network is determined. The computing device may determine the plurality of coefficients associated with the predictive model. The plurality of coefficients may indicate a probability that the known user device is connected to the wireless network. The plurality of coefficients may be based on a time period associated with the plurality of times. The network device may send the data that indicates the plurality of times the user device is connected to the wireless network to the computing device.

At step 730, a vector associated with the known user device is determined. The network device and/or a computing device may determine the vector based on the plurality of coefficients. The vector may be a feature vector. The vector may comprise the plurality of coefficients to represent the probability that the user device is connected to a network. For example, if a time model to predict "connected vs. not connected" (with a sine and a cosine of 1 day and 1 week periods), the vector may have 5 features that comprise the 5 coefficients from the "connected vs. not connected" time model. Accordingly, the vector may represent the respective user device's usage patterns of the user device.

At step 740, one or more labels of the known user device are associated with the vector.

The one or more labels may be associated with one or more characteristics of the known user device. As an example, a label of "smartphone model 1 of manufacturer A" may be associated with the specifications (e.g., memory, processor, size, screen size, MAC address, year manufactured, etc.) of the smartphone model 1 of manufacturer A. The one or more labels may be determined without inspecting the contents of the data packets. The computing device may determine inferential demographics associated with a user of the known user device based on the demographics of the one or more previously identified users. For example, because the user device is a known user device, the demographics of a user of the known user device may be known. Thus, the labels may be based on the known information of the known user device.

At step 750, the vector and the one or more labels are added to a training set of data (e.g., the training data set 502 of FIG. 5). The training set of data may be utilized by a first stage of machine learning to train a model. For example, the training set of data may comprise information (e.g., data) associated with a plurality of known user devices, with each of the known user devices having a respective one or more labels. The training set of data may be provided to (e.g., sent to, ingested by, etc.) the first stage of machine learning.

Figure 8:
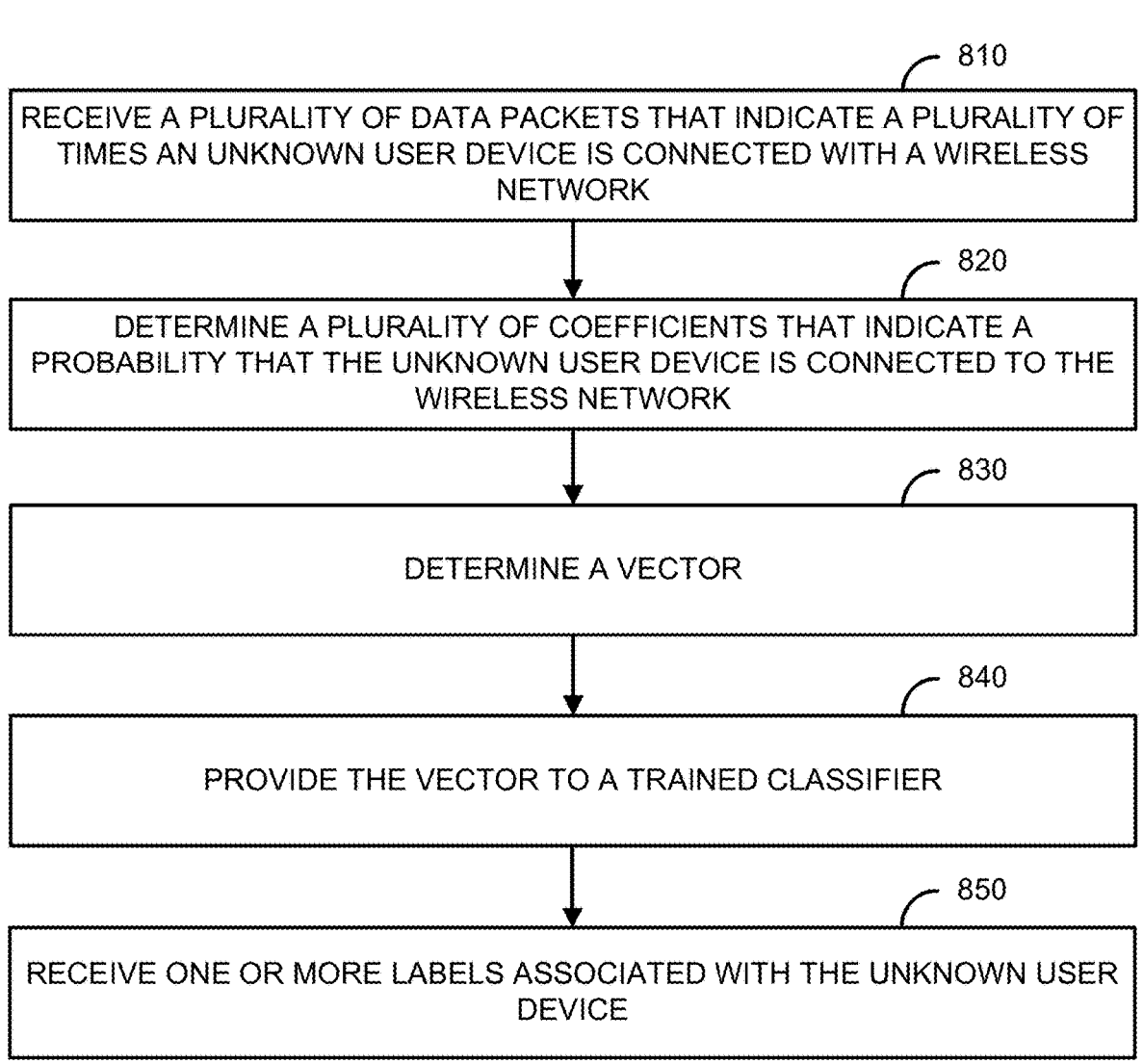
FIG. 8 shows a flowchart of an example method for characterizing a wireless device.

FIG. 8 is a flowchart of a method 800 for wireless communication. At step 810, a plurality of data packets that indicate a plurality of times that an unknown user device is connected with a wireless network are received. The plurality of data packets may be received by a network device (e.g., the network device 104 of FIGS. 1 & 2). The unknown user device may be a computing device (e.g., the user device 102 of FIGS. 1 & 2). The plurality of data packets may be received from the computing device. The plurality of times may be determined by the network device without inspecting the contents of the data packets.

At step 820, a plurality of coefficients that indicate a probability that the unknown user device is connected to the wireless network is determined. The network device may determine the plurality of coefficients that indicate a probability that the device is connected to the wireless network.

The plurality of coefficients may be based on a time period associated with the plurality of times. The network device may send the data that indicates the plurality of times the user device is connected to the wireless network to another device (e.g., the computing device 106 of FIGS. 1 & 2). The network device may receive the plurality of coefficients. The network device may receive the plurality of coefficients based on sending the data to the another device At step 830, a vector associated with the known user device is determined. The network device and/or a computing device may determine the vector based on the plurality of coefficients. The vector may be a feature vector. The vector may comprise the plurality of coefficients to represent the probability that the user device is connected to a network. For example, if a time model to predict "connected vs. not connected" (with a sine and a cosine of 1 day and 1 week periods), the vector may have 5 features that comprise the 5 coefficients from the "connected vs. not connected" time model. Accordingly, the vector may represent the respective user device's usage patterns of the user device.

At step 840, the vector may be provided to a trained classifier (e.g., the trained model 504). The trained classifier may be a classifier configured to determine one or more labels based on the vector. For example, the trained classifier may be configured to receive the vector as an input and output one or more labels associated with the unknown user device. The one or more labels may be associated with one or more characteristics of the unknown device. As an example, a label of "smartphone model 1 of manufacturer A" may be associated with the specifications (e.g., memory, processor, size, screen size, MAC address, year manufactured, etc.) of the smartphone model 1 of manufacturer A. The one or more labels may indicate demographics associated with a user of the unknown device.

At step 850, one or more labels associated with the unknown user device are received. The trained classifier may send (e.g., provide, output, etc.) the one or more labels to the network device and/or the computing device. The one or more labels may be determined without inspecting the contents of the data packets. The network device and/or the another computing device may determine a specific user of a plurality of users associated with a user account. The specific user may be determined based on the one or more labels associated with the unknown device. The network device and/or the another computing device may associate the specific user with the unknown device.

Figure 9:
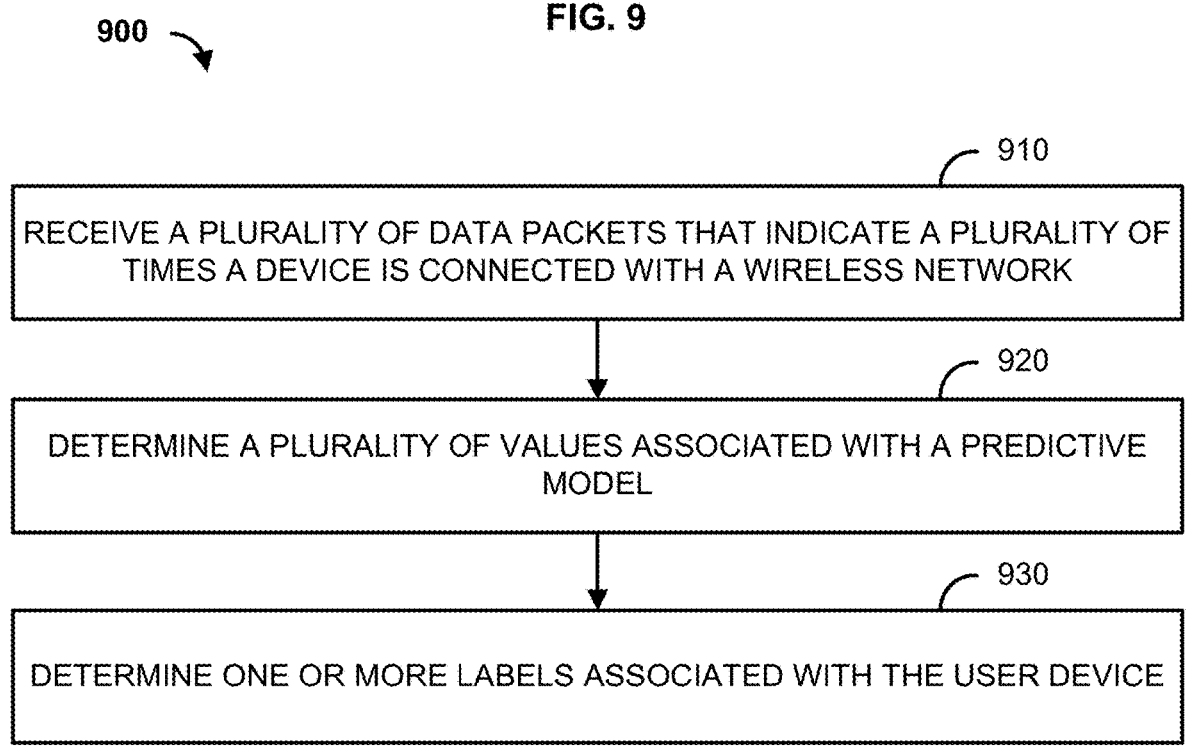
FIG. 9 shows a flowchart of an example method for characterizing a wireless device.

FIG. 9 is a flowchart of a method 900 for characterizing a wireless device. At step 910, a plurality of data packets that indicate a plurality of times a device is connected with a wireless network is received. The plurality of data packets may be received by a network device (e.g., the network device 104 of FIGS. 1 & 2). The device may be a computing device (e.g., the user device 102 of FIGS. 1 & 2). The plurality of data packets may be received from the computing device. The plurality of data packets may be associated with the plurality of times. For example, each data packet of the plurality of data packets may be associated with a time stamp for when the data packet was sent and/or received by a device. As an example, each data packet may have a respective time stamp associated with it. As another example, a single data packet may indicate the plurality of times. The plurality of times may be determined by the network device without inspecting the contents of the data packets. The plurality of data packets may be received by another computing device (e.g., the computing device 106 of FIGS. 1 & 2). For example, the network device may send the data packets to the another computing device.

At step 920, a plurality of values associated with a predictive model are determined. The network device and/or the another computing device may determine the plurality of values associated with the predictive model. The plurality of values may indicate a probability that the device is connected to the wireless network. The plurality of values may be one or more coefficients. The plurality of values may be based on a time period associated with the plurality of times. The network device may send the data that indicates the plurality of times the user device is connected to the wireless network to another device (e.g., the computing device 106 of FIGS. 1 & 2). The network device may receive the plurality of values. The network device may receive the plurality of values based on sending the data to the another device.

At step 930, one or more labels associated with the device are determined. The one or more labels may be associated with one or more characteristics of the device. As an example, a label of "smartphone model 1 of manufacturer A" may be associated with the specifications (e.g., memory, processor, size, screen size, MAC address, year manufactured, etc.) of the smartphone model 1 of manufacturer A. The one or more labels may be determined without inspecting the contents of the data packets. The network device and/or the another computing device may determine inferential demographics associated with a user of the user device based on the demographics of the one or more previously identified users. The network device and/or the another computing device may determine a specific user of a plurality of users associated with a user account. The specific user may be determined based on the inferential demographics of the user of the user device. The network device and/or the another computing device may associate the specific user with the device.

The network device and/or a computing device may determine a vector based on the plurality of values. For example, the vector may be a data structure configured to comprise (e.g., store, contain, etc.) the plurality of values. The vector may be a feature vector. The vector may comprise the plurality of values to represent the probability that the user device is connected to a network. For example, if a time model to predict "connected vs. not connected" (with a sine and a cosine of 1 day and 1 week periods), the vector may have 5 features that comprise the 5 coefficients from the "connected vs. not connected" time model. Accordingly, the vector may represent the respective user device's usage patterns of the user device. The vector may comprise one or more coefficients. For example, the plurality of values may comprise one or more coefficients, and the vector may comprise the one or more coefficients.

Figure 10:
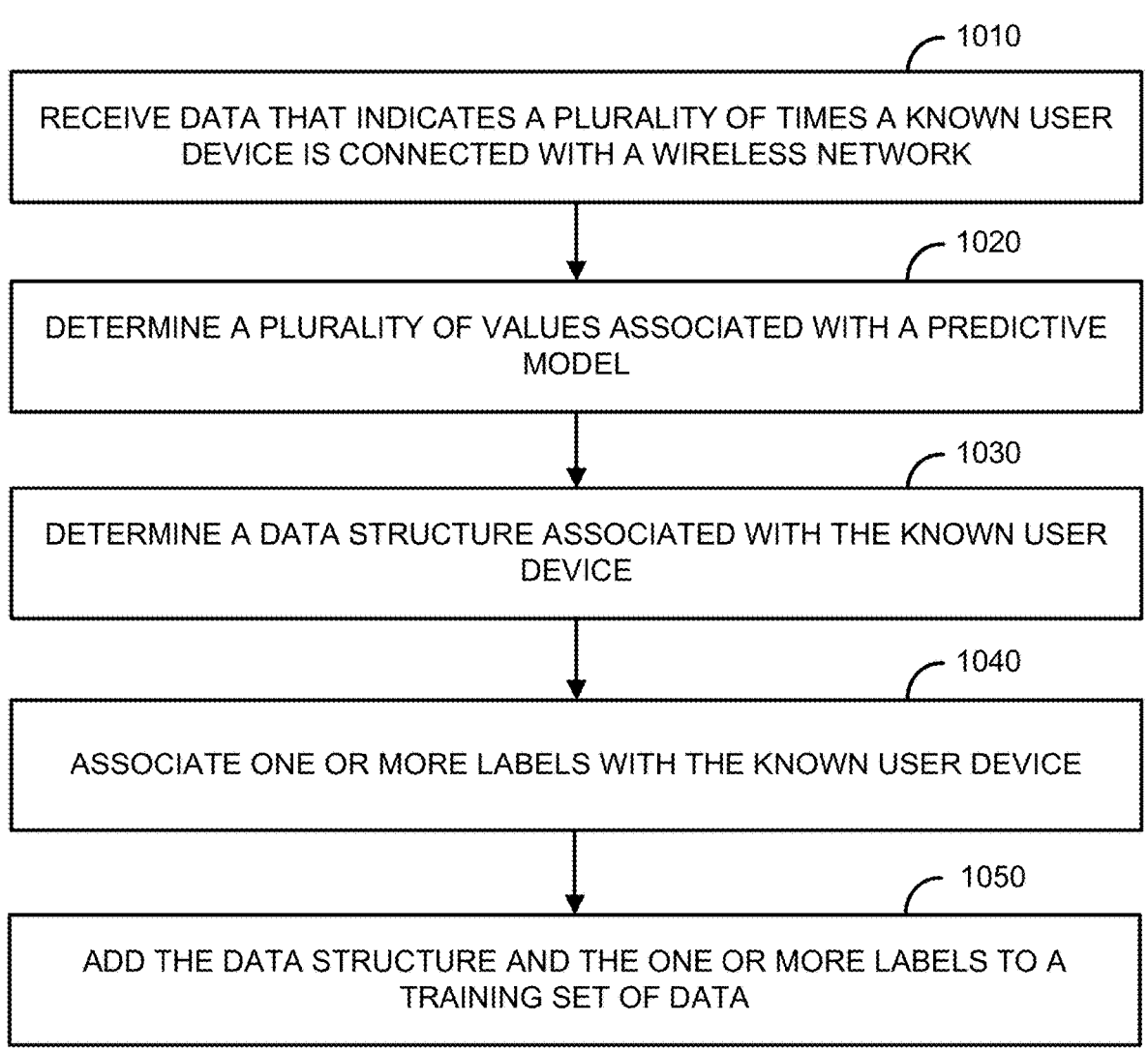
FIG. 10 shows a flowchart of an example method for characterizing a wireless device.

FIG. 10 is a flowchart of a method 1000 for characterizing a wireless device. At step 1010, data that indicates a plurality of times a known user device is connected with a wireless network is received. The data packets may be received by a computing device (e.g., the computing device 106 of FIGS. 1 & 2). The computing device may receive the data from a network device (e.g., the network device 104 of FIGS. 1 & 2). The known user device may be another computing device (e.g., the user device 102 of FIGS. 1 & 2). The plurality of data packets may be received from the known user device. The plurality of data packets may be associated with the plurality of times. For example, each data packet of the plurality of data packets may be associated with a time stamp for when the data packet was sent and/or received by a device. As an example, each data packet may have a respective time stamp associated with it. As another example, a single data packet may indicate the plurality of times. The plurality of times may be determined by the network device without inspecting the contents of the data packets. The plurality of data packets may be received by another computing device (e.g., the computing device 106 of FIGS. 1 & 2). For example, the network device may send the data packets to the another computing device.

At step 1020, a plurality of values associated with a predictive model are determined. The computing device may determine the plurality of values associated with the predictive model. The plurality of values may indicate a probability that the known user device is connected to the wireless network. The plurality of values may be one or more coefficients. The plurality of values may be based on a time period associated with the plurality of times. The network device may send the data that indicates the plurality of times the user device is connected to the wireless network to the computing device.

At step 1030, a data structure associated with the known user device is determined. The data structure may be data structure configured to comprise (e.g., store, contain, etc.) the plurality of values. For example, the data structure may be a vector. The computing device may determine the vector based on the plurality of values. For example, the vector may be a feature vector. The vector may comprise the plurality of values to represent the probability that the known user device is connected to a network. As an example, if a time model to predict "connected vs. not connected" (with a sine and a cosine of 1 day and 1 week periods), the vector may have 5 features that comprise the 5 values (e.g., coefficients) from the "connected vs. not connected" time model. Accordingly, the vector may represent the respective user device's usage patterns of the known user device. The vector may comprise one or more coefficients. For example, the plurality of values may comprise one or more coefficients, and the vector may comprise the one or more coefficients.

At step 1040, one or more labels are associated with the known user device. The one or more labels may be associated with one or more characteristics of the known user device. As an example, a label of "smartphone model 1 of manufacturer A" may be associated with the specifications (e.g., memory, processor, size, screen size, MAC address, year manufactured, etc.) of the smartphone model 1 of manufacturer A. The one or more labels may be determined without inspecting the contents of the data packets. The computing device may determine inferential demographics associated with a user of the known user device based on the demographics of the one or more previously identified users. For example, because the user device is a known user device, the demographics of a user of the known user device may be known. Thus, the labels may be based on the known information of the known user device.

At step 1050, the data structure and the one or more labels are added to a training set of data. The training set of data may be utilized by a first stage of machine learning to train a model. For example, the training set of data may comprise information (e.g., data) associated with a plurality of known user devices, with each of the known user devices having a respective one or more labels. The training set of data may be provided to (e.g., sent to, ingested by, etc.) the first stage of machine learning.

Figure 11:
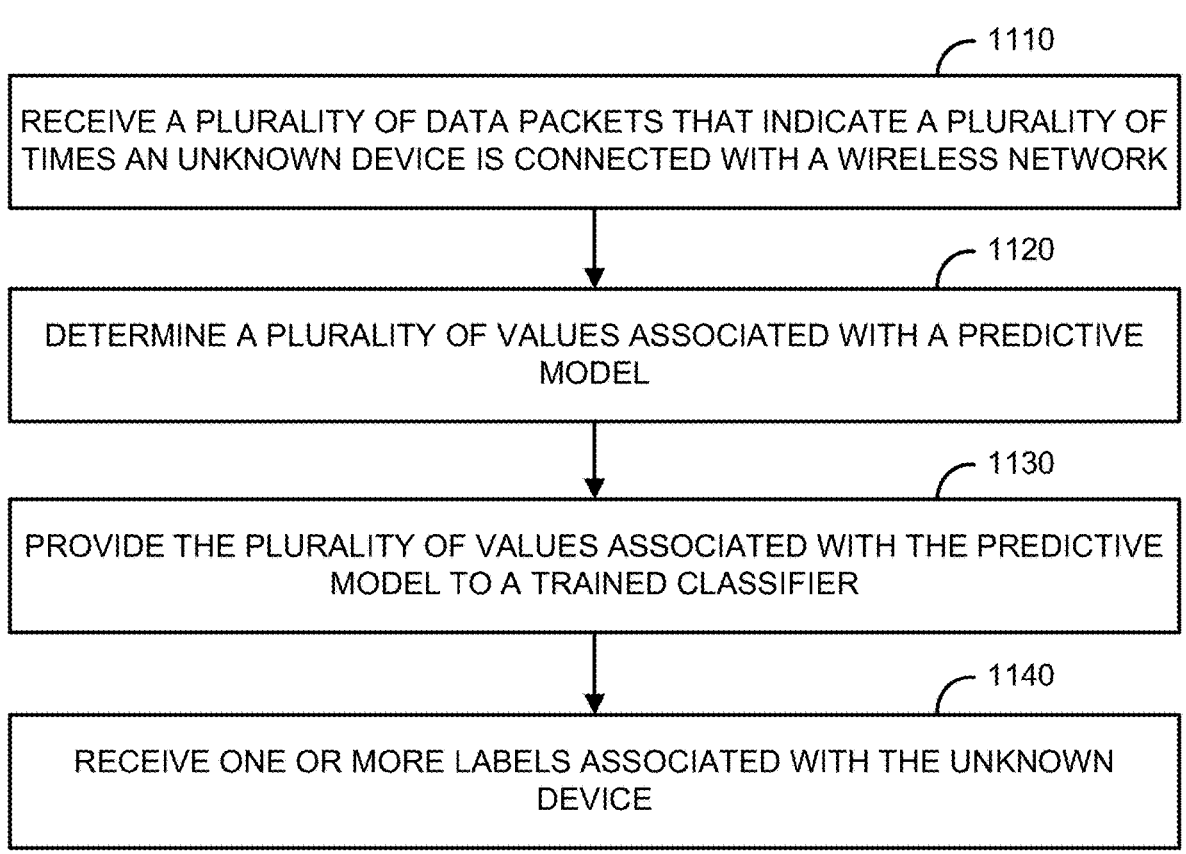
FIG. 11 shows a flowchart of an example method for characterizing a wireless device.

FIG. 11 is a flowchart of a method 1100 for characterizing a wireless device. At step 1110, data that indicates a plurality of times an unknown device is connected with a wireless network is received. The plurality of data packets may be received by a network device (e.g., the network device 104 of FIGS. 1 & 2). The unknown device may be a computing device and/or a user device (e.g., the user device 102 of FIGS. 1 & 2). The plurality of data packets may be received from the unknown device. The plurality of data packets may be associated with the plurality of times. For example, each data packet of the plurality of data packets may be associated with a time stamp for when the data packet was sent and/or received by a device. As an example, each data packet may have a respective time stamp associated with it. As another example, a single data packet may indicate the plurality of times. The plurality of times may be determined by the network device without inspecting the contents of the data packets. The plurality of data packets may be received by another computing device (e.g., the computing device 106 of FIGS. 1 & 2). For example, the network device may send the data packets to the another computing device.

At step 1120, a plurality of values associated with a predictive model are determined. The network device and/or the another computing device may determine the plurality of values associated with the predictive model. The plurality of values may indicate a probability that the unknown device is connected to the wireless network. The plurality of values may be one or more coefficients. The plurality of values may be based on a time period associated with the plurality of times. The network device may send the data that indicates the plurality of times the unknown device is connected to the wireless network to another device (e.g., the computing device 106 of FIGS. 1 & 2). The network device may receive the plurality of values. The network device may receive the plurality of values based on sending the data to the another device.

At step 1130, the plurality of values associated with the predictive model are provided to a trained classifier. The network device and/or the computing device may determine the plurality of values associated with the predictive model. The plurality of values may indicate a probability that the device is connected to the wireless network. The plurality of values may be one or more coefficients. The plurality of values may be based on a time period associated with the plurality of times. The network device may send the data that indicates the plurality of times the user device is connected to the wireless network to another device (e.g., the computing device 106 of FIGS. 1 & 2). The network device may receive the plurality of values. The network device may receive the plurality of values based on sending the data to the another device.

The trained classifier may be a classifier configured to determine one or more labels based on the plurality of values. The one or more labels may be associated with one or more characteristics of the unknown device. As an example, a label of "smartphone model 1 of manufacturer A" may be associated with the specifications (e.g., memory, processor, size, screen size, MAC address, year manufactured, etc.) of the smartphone model 1 of manufacturer A. The trained classifier may receive the plurality of values as an input, and the trained classifier may output the one or more labels associated with the unknown device. The one or more labels may indicate demographics associated with a user of the unknown device.

The network device and/or a computing device may determine a vector based on the plurality of values. For example, the vector may be a data structure configured to comprise (e.g., store, contain, etc.) the plurality of values. The vector may be a feature vector. The vector may comprise the plurality of values to represent the probability that the user device is connected to a network. For example, if a time model to predict "connected vs. not connected" (with a sine and a cosine of 1 day and 1 week periods), the vector may have 5 features that comprise the 5 coefficients from the "connected vs. not connected" time model. Accordingly, the vector may represent the respective user device's usage patterns of the user device. The vector may comprise one or more coefficients. For example, the plurality of values may comprise one or more coefficients, and the vector may comprise the one or more coefficients. The vector may be provided to the trained classifier as an input.

At step 1140, one or more labels associated with the unknown device are received. The trained classifier may send (e.g., provide, output, etc.) the one or more labels to the network device and/or the computing device. The one or more labels may be determined without inspecting the contents of the data packets. The network device and/or the another computing device may determine a specific user of a plurality of users associated with a user account. The specific user may be determined based on the one or more labels associated with the unknown device. The network device and/or the another computing device may associate the specific user with the unknown device.

Figure 12:
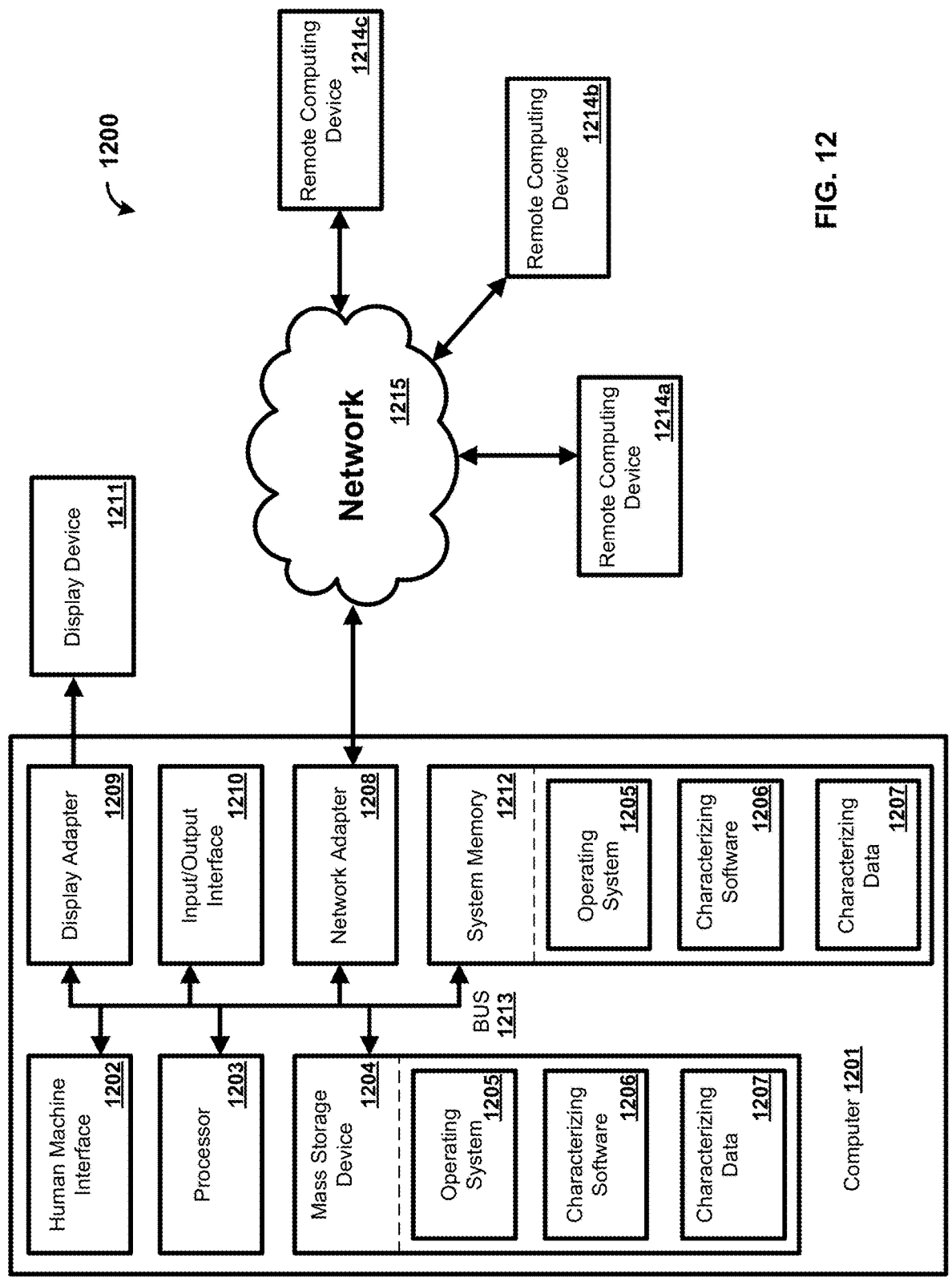
FIG. 12 shows an block diagram of an example computing device for wireless communication.

FIG. 12 shows a system 1200 for wireless communication. The user device 102, the network device 104, and/or the computing device 106 of FIGS. 1 & 2 may be a computer 1201 as shown in FIG. 12. The computer 1201 may comprise one or more processors 1203, a system memory 1212, and a bus 1213 that couples various system components including the one or more processors 1203 to the system memory 1212. In the case of multiple processors 1203, the computer 1201 may utilize parallel computing. The bus 1213 is one or more of several possible types of bus structures, including a memory bus or memory controller, a peripheral bus, an accelerated graphics port, or local bus using any of a variety of bus architectures.

The computer 1201 may operate on and/or comprise a variety of computer readable media (e.g., non-transitory). The readable media may be any available media that is accessible by the computer 1201 and may include both volatile and non-volatile media, removable and non-removable media. The system memory 1212 has computer readable media in the form of volatile memory, such as random access memory (RAM), and/or non-volatile memory, such as read only memory (ROM). The system memory 1212 may store data such as the characterizing data 1207 and/or program modules such as the operating system 1205 and the characterizing software 1206 that are accessible to and/or are operated on by the one or more processors 1203. The machine learning module may comprise one or more of the characterizing data 1207 and/or the characterizing software 1206.

The computer 1201 may also have other removable/non-removable, volatile/non-volatile computer storage media. FIG. 12 shows the mass storage device 1204 which may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 1204, such as the operating system 1205 and the characterizing software 1206. Each of the operating system 1205 and the characterizing software 1206 (or some combination thereof) may have elements of the program modules and the characterizing software 1206. The characterizing data 1207 may also be stored on the mass storage device 1204. The characterizing data 1207 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1215.

A user may enter commands and information into the computer 1201 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1203 via a human machine interface 1202 that is coupled to the bus 1213, but may be connected by other interface and bus structures, such as a parallel port, game port, an IEEE 1394 Port (also known as a Firewire port), a serial port, network adapter 1208, and/or a universal serial bus (USB).

The display device 1211 may also be connected to the bus 1213 via an interface, such as the display adapter 1209. It is contemplated that the computer 1201 may have more than one display adapter 1209 and the computer 1201 may have more than one display device 1211. The display device 1211 may be a monitor, an LCD (Liquid Crystal Display), light emitting diode (LED) display, television, smart lens, smart glass, and/or a projector. In addition to the display device 1211, other output peripheral devices may be components such as speakers (not shown) and a printer (not shown) which may be connected to the computer 1201 via the Input/Output Interface 1210. Any step and/or result of the methods may be output (or caused to be output) in any form to an output device. Such output may be any form of visual representation, including, but not limited to, textual, graphical, animation, audio, tactile, and the like. The display device 1211 and computer 1201 may be part of one device, or separate devices.

The computer 1201 may operate in a networked environment using logical connections to one or more remote computing devices 1214a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1201 and a remote computing device 1214a,b,c may be made via a network 1215, such as a local area network (LAN) and/or a general wide area network (WAN). Such network connections may be through the network adapter 1208. The network adapter 1208 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components reside at various times in different storage components of the computing device 1201, and are executed by the one or more processors 1203 of the computer. An implementation of the characterizing software 1206 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a network device via a wireless network, a plurality of data packets that indicate a plurality of times a user device is connected to the wireless network;
determining, based on the plurality of data packets, a plurality of values associated with a predictive model, wherein the predictive model indicates a probability that the user device is connected to the wireless network; and
determining, based on the plurality of values and via a machine learning model, one or more labels associated with the user device.

2. The method of claim 1, further comprising determining, based on telemetric data, periodic time patterns of one or more telemetric variables, wherein the one or more labels associated with the user device are determined without inspecting contents of the plurality of data packets.

3. The method of claim 1, further comprising determining, based on the plurality of values associated with the predictive model, a vector, wherein determining the one or more labels associated with the user device is further based on the vector.

4. The method of claim 1, wherein a first portion of the predictive model is based on a sine function, and wherein a second portion of the predictive model is based on a cosine function.

5. The method of claim 1, further comprising:
sending, to a computing device, data that indicates the plurality of times the user device is connected to the wireless network; and
receiving the one or more labels associated with the user device.

6. The method of claim 1, further comprising determining, based on the one or more labels associated with the user device, inferential demographics associated with a user of the user device.

7. The method of claim 6, further comprising:
determining, based on the inferential demographics of the user of the user device, a specific user of a plurality of users associated with a user account; and
associating the specific user with the user device.

8. A method comprising:
receiving, by a computing device, data that indicates a plurality of times a known user device is connected to a wireless network;
determining, based on a time period associated with the plurality of times, a plurality of values associated with a predictive model, wherein the predictive model indicates a probability that the known user device is connected to the wireless network;
determining, based on the plurality of values, a data structure associated with the known user device;
associating one or more labels with the known user device, wherein the one or more labels indicate one or more characteristics of the known user device; and
adding the data structure associated with the known user device and the one or more labels to a training set of data.

9. The method of claim 8, wherein the data structure comprises a vector associated with the plurality of values, and wherein the data is based on a plurality of data packets sent by the known user device via the wireless network.

10. The method of claim 8, wherein the one or more labels indicate inferential demographics of a user of the known user device.

11. The method of claim 8, further comprising determining, based on telemetric data, periodic time patterns of one or more telemetric variables.

12. The method of claim 8, wherein a first portion of the predictive model is based on a sine function, and wherein a second portion of the predictive model is based on a cosine function.

13. The method of claim 8, wherein the training set of data is utilized to train a classifier.

14. The method of claim 10, further comprising:
determining, based on the inferential demographics of the user of the known user device, a specific user of a plurality of users associated with a user account; and
associating the specific user with the known user device.

15. A method comprising:
receiving, by a network device via a wireless network, a plurality of data packets that indicate a plurality of times an unknown user device is connected to the wireless network;
determining, based on a time period associated with the plurality of times, a plurality of values associated with a predictive model, wherein the predictive model indicates a probability that the unknown user device is connected to the wireless network;
providing, to a trained classifier, the plurality of values associated with the predictive model; and
receiving one or more labels associated with the unknown user device.

16. The method of claim 15, further comprising:
determining, based on the one or more labels, a specific user of a plurality of users associated with a user account; and
associating the specific user with the unknown user device.

17. The method of claim 15, further comprising determining a vector associated with the plurality of values, wherein the one or more labels are determined without inspecting contents of the plurality of data packets.

18. The method of claim 15, wherein the one or more labels associated with the unknown user device indicate one or more inferential demographics associated with a user of the unknown user device.

19. The method of claim 15, wherein the one or more labels associated with the unknown user device indicate one or more characteristics of the unknown user device.

20. The method of claim 15, wherein a first portion of the predictive model is based on a sine function, and wherein a second portion of the predictive model is based on a cosine function.

* * * * *